United States Patent [19]
Hattori

[11] Patent Number: 6,069,649
[45] Date of Patent: May 30, 2000

[54] STEREOSCOPIC DISPLAY

[76] Inventor: Tomohiko Hattori, 28, 1, Daikou 3-chome, Higashi-ku, Nagoya-shi, Aichi-ken, Japan

[21] Appl. No.: 08/511,585

[22] Filed: Aug. 4, 1995

[30]  Foreign Application Priority Data

| Aug. 5, 1994 | [JP] | Japan | 6-204286 |
| Oct. 6, 1994 | [JP] | Japan | 6-270375 |
| Nov. 22, 1994 | [JP] | Japan | 6-312737 |

[51] Int. Cl.$^7$ ............................................... H04N 13/00
[52] U.S. Cl. .................. 348/51; 348/42; 348/52; 359/458; 359/462
[58] Field of Search .................. 348/51, 42, 43, 348/44, 52, 54, 56–60; 359/495, 619, 458, 462; 342/180; 352/57; 353/6–7; 396/324; H04N 13/00

[56]  References Cited

U.S. PATENT DOCUMENTS

| 5,223,925 | 6/1993 | Hattori | 348/51 |
| 5,258,833 | 11/1993 | Schenk | 348/51 |
| 5,311,220 | 5/1994 | Eichenlaub | 348/55 |
| 5,315,377 | 5/1994 | Isono et al. | 348/51 |
| 5,430,474 | 7/1995 | Hines | 348/51 |
| 5,457,574 | 10/1995 | Eichenlaub | 359/619 |
| 5,537,144 | 7/1996 | Faris | 348/58 |
| 5,537,256 | 7/1996 | Fergason | 359/495 |
| 5,546,120 | 8/1996 | Miller et al. | 348/59 |

FOREIGN PATENT DOCUMENTS

| 601308 | 6/1994 | European Pat. Off. | H04N 13/04 |
| 2206763 | 1/1989 | United Kingdom | H04N 13/04 |

OTHER PUBLICATIONS

Patent Abstract of Japan, vol. 018 No. 286 (E1556), May 31, 1994, re JP-A-06 054348.

*Primary Examiner*—Tommy P. Chin
*Assistant Examiner*—Vu Le
*Attorney, Agent, or Firm*—Pillsbury Madison & Sutro LLP

[57]  ABSTRACT

A stereoscopic display which enables plural persons to simultaneously observe stereoscopic images includes a color liquid crystal plate for displaying stereo-pairs composed of left and right eye perspectives in time-interlaced manner, a monochrome TV display disposed behind the color liquid crystal plate for displaying binary and inverted binary images of half face of each observer so as to be synchronized with the time-interlaced display of the color liquid crystal plate, and a large convex lens disposed between the color liquid crystal plate and the monochrome TV display so as to focus the observers' optical images on the screen of the monochrome TV display in geometrical agreement with the observers' face images displayed thereby. And an infrared TV camera is disposed so as to take observers' images by way of the large convex lens and input observers' face images to the monochrome TV display.

40 Claims, 12 Drawing Sheets

STEREOSCOPIC DISPLAY

The following priority applications, Japanese Patent Application No. Hei 6-204286, filed in Japan on Aug. 5, 1994; Japanese Patent Application No. Hei 6-270375, filed in Japan on Oct. 6, 1994; and Japanese Patent Application No. Hei 6-312737, filed in Japan on Nov. 22, 1994 are hereby incorporated by reference into the present specification.

BACKGROUND OF THE INVENTION

1. Field of the Invention

The present invention relates to a stereoscopic display which enables observation of stereoscopic images without wearing special glasses or the like.

2. Description of Related Art

The present inventor has already proposed stereoscopic displays (U.S. patent applications Ser. Nos. 08/135,482 and 08/426,131). These displays respectively include a color liquid crystal plate for displaying stereo-pairs composed of right and left eye perspectives selectively, a monochrome TV display for displaying face images of each observer, and a large convex lens or arrayed convex lens for directing the right and left eye perspectives to respective right and left eyes of each observer based on the face images of the monochrome TV display.

These displays enable simultaneous observation of stereoscopic images by plural persons without wearing special glasses. With these displays, images of each observer are continuously taken by an infrared TV camera which is disposed under the large convex lens or arrayed convex lens, and binary images of each observer is formed based on the taken images of each observer, and displayed by the monochrome TV display. These displays, however, have the problem that, since there is a distance between the principle optical axis of the large convex lens or arrayed convex lens and that of the infrared TV camera, there is a possibility of a large parallax being generated between the observer's face images displayed by the screen of the monochrome TV display and the observer's optical images projected onto the screen of the monochrome TV display by the large convex lens or arrayed convex lens, and this results in the observation of the stereoscopic images becoming difficult.

SUMMARY OF THE INVENTION

It is an object of the present invention to provide a stereoscopic display which enables simultaneous observation of stereoscopic images free from any parallax by plural persons without wearing special glasses or the like.

The stereoscopic display in accordance with the present invention includes stereo-pairs display means for selectively displaying stereo-pairs composed of right and left eye perspectives to be observed by observers, observers' face images display means for displaying observers' face images adapted to direct stereo-pairs displayed by the stereo-pairs display means to right and left eyes of the respective observers with accuracy, focusing means for directing the stereo-pairs displayed by the stereo-pairs display means to right and left eyes of each observer based on the observers' face images displayed by the observers' face images display means. The focusing means is situated in the position from which it focuses observers' optical images substantially on a screen of the observers' face images display means in geometrical agreement with the observers' face images displayed thereby.

The stereoscopic display in accordance with the present invention further includes taking means for continuously taking observers' images adapted to form observers' face images to be displayed by the observers' face images display means, by way of the focusing means.

The taking means is preferably situated between the focusing means and the observers' face images display means. In one example, the taking means is composed of a half mirror situated on an optical axis of the focusing means so as to face the focusing means, and a video camera which can detect the optical strength of a predetermined light reflected by the half mirror. In another example, the taking means is composed of a member which can detect the optical strength of a predetermined light transmitted by way of the focusing means in the vicinity of a screen of the observers' face images display means. Preferably, the stereoscopic display in accordance with the present invention further includes illuminating means for illuminating observers with a predetermined light.

The stereo-pairs display means, observers' face images display means and focusing means of the stereoscopic display in accordance with the present invention can take the following several aspects.

In a first aspect of the invention, the stereo-pairs display means is composed of transparent type electro-optical spatial modulation elements disposed between the observers and the focusing means to display the stereo-pairs in time-interlaced state, and the observers' face images display means is composed of a surface light source unit disposed behind the focusing means to display pairs of observers' face images of which flashing regions are inverted each other in time-interlaced manner. The transparent type electro-optical spatial modulation elements selectively use one of each pair of observers' face images displayed by the surface light source unit as back light so as to be synchronized with the time-interlaced display thereof. In one preferred embodiment, the surface light source unit is composed of a surface light source of which flashing regions are variable so as to be synchronized with the time-interlaced display of the electro-optical spatial modulation elements. And in another preferred embodiment, the surface light source unit is composed of at least one light source and transparent type electro-optical spatial modulation elements provided on a light emission side of the at least one light source.

In a second aspect of the invention, the stereo-pairs display means is composed of transparent type electro-optical spatial modulation elements disposed between the observers and the focusing means to display the stereo-pairs in time-parallel state, and the observers' face images display means is composed of a surface light source unit which is disposed behind the focusing means to display pairs of observers' face images of which polarization axes are oriented approximately 90° with respect to each other. The transparent type electro-optical spatial modulation elements selectively use one of each pair of observers' face images displayed by the surface light source unit as back light. In a preferred embodiment, the surface light source unit includes a surface light source of which regions for emitting light rays of polarization axes oriented approximately 90° with respect to each other are variable, or includes a surface light source of which flashing regions are substantially variable and two polarization plates of which polarization axes are oriented approximately 90° so as to correspond to the displayed pairs of observers' face images. In the latter case, the surface light source unit is composed of a monochrome liquid crystal TV display, and in two polarization plates of the monochrome liquid crystal TV display, two kinds of regions of which polarization axes are oriented approximately 90° with respect to each other are distributed with uniformity.

In the second aspect of the invention, the transparent type electro-optical spatial modulation elements can be composed of a color liquid crystal image display plate wherein regions displaying left eye perspectives and those displaying right eye perspectives are alternately distributed with uniformity, and a polarizer on an input side thereof has such a member as to rotate polarization axes approximately 90° so as to correspond to the above regions of the color liquid crystal image display plate.

In a third aspect of the invention, the stereo-pairs display means is composed of a surface light source disposed behind the observers' face images display means to display stereo-pairs in time-interlaced state, and the observers' face images display means is composed of transparent type electro-optical spatial modulation elements behind the focusing means to display pairs of observers' face images of which transparent regions are substantially inverted in time-interlaced manner. In one preferred embodiment, the surface light source unit is composed of a surface light source of which flashing regions are variable so as to be synchronized with the time-interlaced display of the electro-optical spatial modulation elements.

In a fourth aspect of the invention, the stereo-pairs display means is composed of a surface light source disposed behind the observers' face images display means to display the stereo-pairs in time-parallel manner, the observers' face images display means is composed of transparent type electro-optical spatial modulation elements disposed behind the focusing means to display pairs of observers' face images of which polarization axes are oriented approximately 90° with respect to each other. The transparent type electro-optical spatial modulation elements selectively transmit one of the stereo-pairs displayed by the surface light source.

In the fourth aspect, the surface light source is composed of a color liquid crystal display of which a polarization plate as an analyzer has two polarization axes, each corresponding to the right eye perspective display part or the left eye perspective display part, which are alternately oriented approximately 90° with respect to each other, or is composed of two projectors which respectively project the right eye perspective and left eye perspective having different polarization axes oriented approximately 90° with respect to each other, and a diffuser which is disposed in the projection surface of the two projectors to compose the right eye perspective and left eye perspective without any variation of the polarization axes thereof.

In the fourth aspect, the transparent type electro-optical spatial modulation elements are composed of a monochrome liquid crystal display wherein two kinds of areas of which the polarization axes are oriented approximately 90° with each other are distributed substantially uniformly in the polarization plates thereof.

In a fifth aspect, the stereo-pairs display means is composed of transparent type electro-optical spatial modulation elements disposed between observers and the focusing means to display stereo-pairs in time-parallel state, and the observers' face images display means is composed of a surface light source unit disposed behind the focusing means to display pairs of observers' face images of which flashing regions are substantially inverted in time-interlaced manner. The transparent type electro-optical spatial modulation elements selectively use one of each pair of observer's face images displayed by the surface light source unit as backlight so as to be synchronized with the time-interlaced display of the surface light source unit. In addition, an electro-optical spatial modulation element is further disposed between the surface light source unit and the spatial modulation elements for rotating the polarization axes of the pairs of observers' face images displayed by the surface light source unit approximately 90° so as to be synchronized with the time-interlaced display of the surface light source unit.

In a sixth aspect of the invention, the stereo-pairs display means is composed of transparent type electro-optical spatial modulation elements disposed between the observers and the focusing means to display the stereo-pairs in time-interlaced state, and the observers' face images display means is composed of a surface light source unit disposed behind the focusing means to display pairs of observers' face images of which polarization axes are oriented approximately 90° with respect to each other.

In addition, a transparent type electro-optical spatial modulation element is further disposed between the surface light source unit and the spatial modulation elements for rotating the polarization axes of the pairs of observers' face images displayed by the surface light source unit approximately 90° so as to be synchronized with time-interlaced display by the transparent type electro-optical spatial modulation elements.

In a seventh aspect, the stereo-pairs display means is composed of a surface light source disposed behind the observers' face images display means to display the stereo-pairs in time-parallel state, and the observers' face images display means is composed of a transparent type electro-optical spatial modulation elements disposed behind the focusing means to display pairs of observers' face images of which transparent regions are substantially inverted in time-interlaced state. The transparent type electro-optical spatial modulation elements selectively transmit one of the right eye perspective and left eye perspective of the stereo-pairs. In addition, an electro-optical spatial modulation element is further disposed between the surface light source unit and the spatial modulation elements for rotating the polarization axes of the stereo-pairs displayed by the surface light source unit approximately 90° so as to be synchronized with the time-interlaced display of the spatial modulation elements.

In an eighth aspect, the stereo-pairs display means is composed of a surface light source unit disposed behind the observers' face images display means to display the stereo-pairs in time-interlaced state, and the observers' face images display means is composed of transparent type electro-optical spatial modulation elements disposed behind the focusing means to display observers' two face images of which polarization axes are oriented approximately 90° with respect to each other in spatial-multiplexing state. The transparent type electro-optical spatial modulation elements selectively transmit one of the right eye perspective and the left eye perspective of the stereo-pairs in spatial-multiplexing manner. In addition, an electro-optical spatial modulation element is further disposed between the surface light source unit and the spatial modulation elements for rotating the polarization axes of the stereo-pairs displayed by the surface light source unit approximately 90° so as to be synchronized with the time-interlaced display of the surface light source unit.

With the stereoscopic display in accordance with the present invention, the taking means is disposed so as to take observers' images by way of the focusing means. The focusing means focuses optical images of the observers substantially on the screen of the observers' face images display means and projects the observers onto the taking means. This results in the parallax between the observers' optical images focused on the observers' face images display means and the observers' face images taken by the taking means and displayed by the observers' face images display means being hardly generated, and accordingly, the gap therebetween being hardly generated.

With the stereoscopic display of the present invention, only the light rays emitted from or passing the positions where observers' right half face images or left half face images are displayed enter observers' right or left eyes by way of the focusing means. Since the parallax between the observers' face images displayed by the observers' face images display means for directing the stereo-pairs to the observers and the observers' optical images focused substantially on the screen of the observers' face images display means is hardly generated, the stereo-pairs enter the right and left eyes of the observers with accuracy.

Furthermore, the stereoscopic display of the present invention does not require any adjustment of the focusing means, taking means or the like, which has been required conventionally to overlap the observers' optical images focused by the focusing means and the observers' face images taken by the taking means on the screen of the observers' face images display means.

Other objects, features, and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 1:
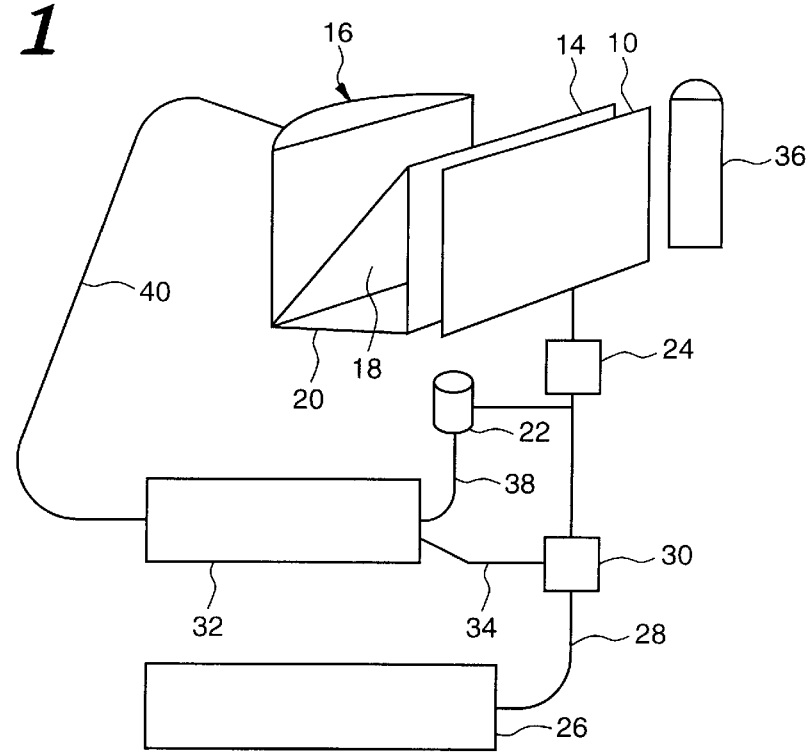
FIG. 1 is a schematic view of a first embodiment of a stereoscopic display in accordance with the present invention.
Figure 2:
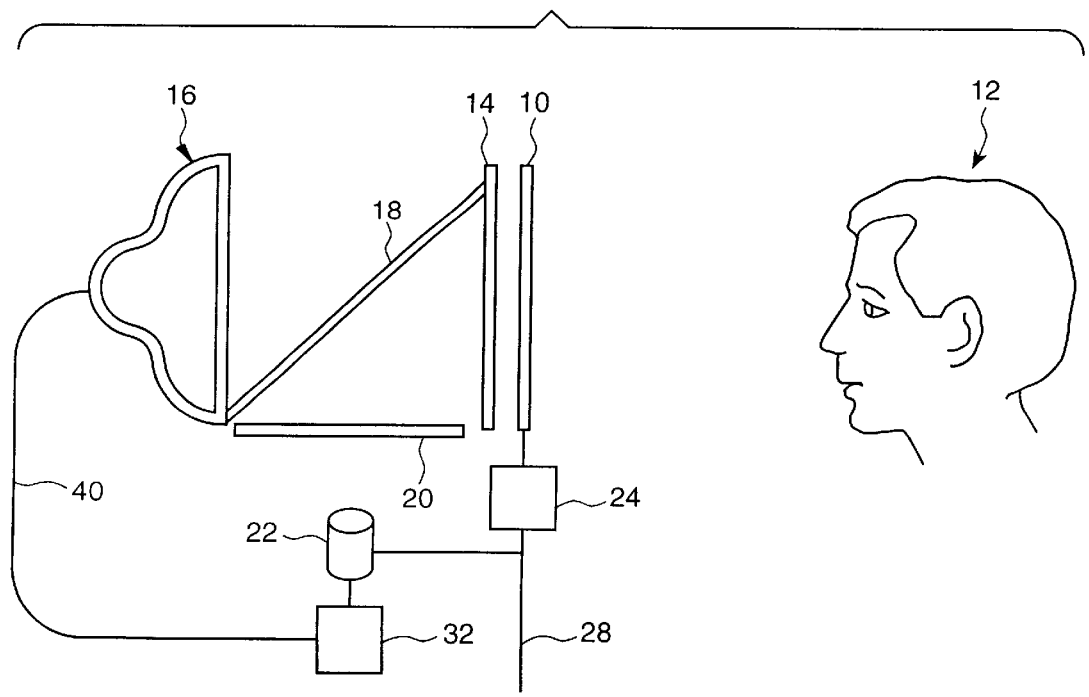
FIG. 2 is a schematic side view of the first embodiment.
Figure 3:
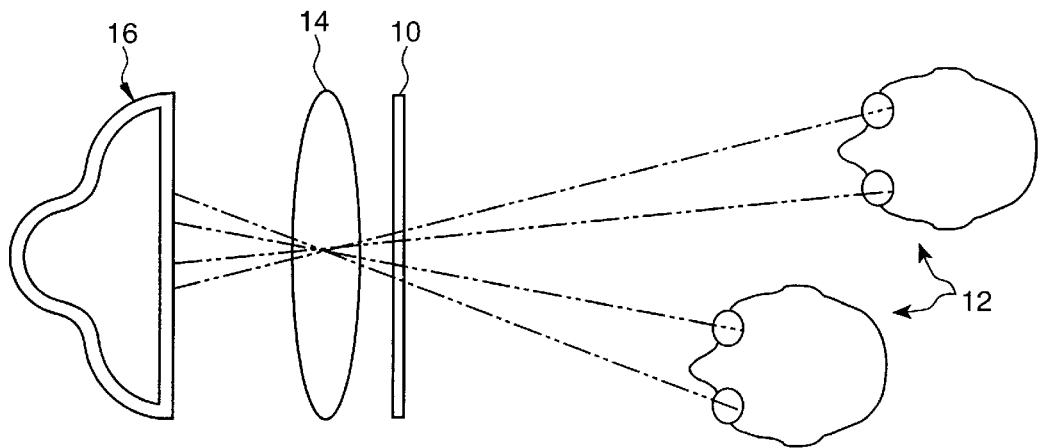
FIG. 3 is a plan view illustrating horizontal optical paths of the first embodiment.

FIGS. 1, 2 and 3 illustrate a first embodiment in accordance with the present invention. As shown, a color liquid crystal plate 10 is disposed such that a screen thereof faces observers 12.

A large convex lens 14 is disposed behind the color liquid crystal plate 10, and a monochrome TV display 16 is disposed such that a screen thereof faces the large convex lens 14 in the vicinity of the position where the large convex lens 14 substantially focuses optical images of each observer 12. A half mirror 18 which reflects infrared light but transmits visible light is disposed between the large convex lens 14 and the monochrome TV display 16. And a diffuser 20 is disposed in or in the vicinity of the position where infrared images of each observer, which are reflected by the half mirror 18, are focused. An infrared TV camera 22 for taking infrared images displayed by the diffuser 20 is disposed so as to face the diffuser 20. Preferably, the infrared TV camera 22 is provided on the principle optical axis of the large convex lens 14.

A matrix circuit 24 is connected to the color liquid crystal plate 10 to drive pixels thereof. A video tape recorder 26 which outputs a stereo-pairs signal 28 is connected to the matrix circuit 24 by way of a stereoscopic synchronizing signal sampling circuit 30, whereby the stereo-pairs signal 28 is input to the matrix circuit 24.

Observers' infrared images taken by the infrared TV camera 22 are input to a binary images forming circuit 32 to drive pixels of the monochrome TV display 16 in synchronization with a stereoscopic synchronizing signal 34 output from the stereoscopic synchronizing signal sampling circuit 30. Furthermore, an infrared light source 36 is disposed on the obliquely right side of the observer 12.

The color liquid crystal plate 10 serves as the stereo-pairs display means, the monochrome TV display 16 serves as the observers' face images display means, the large convex lens 14 serves as the focusing means, and the half mirror 18, diffuser 20 and infrared TV camera 22 serve as the taking means.

In operation, the stereo-pairs signal 28 from the video tape recorder 26 is input to the color liquid crystal plate 10 by way of the stereoscopic synchronizing signal sampling circuit 30 and the matrix circuit 24, whereby the color liquid crystal plate 10 displays stereo-pairs, each composed of right and left eye perspectives.

Each observer 12 is illuminated by the infrared light source 36 from the obliquely right side thereof. The resulting infrared images of each observer 12 pass the color liquid crystal plate 10 and the large convex lens 14, are reflected by the half mirror 18, and are focused on the diffuser 20. The infrared TV camera 22 continuously takes the infrared images focused on the diffuser 20, whereby half face images of each observer 12, of which right half faces are bright while left half faces are dark, are obtained.

The binary images forming circuit 32 outputs a binary and inverted binary images signal 40 based on an observer's face images signal 38 indicating the half face images of each observer 12 to the monochrome TV display 16 in time-interlaced manner in synchronization with the stereoscopic synchronizing signal 34 from the stereoscopic synchronizing signal sampling circuit 30, whereby the screen of the monochrome TV display 16 displays obeservers' face images composed of binary and inverted binary images in time-interlaced manner.

The monochrome TV display 16 is synchronized with the color liquid crystal plate 10 such that when the color liquid crystal plate 10 displays left eye perspectives, for example, the observer's left half face images on the screen of the monochrome TV display 16 emit light rays.

Thus, only the light rays emitted from the observer's left half face images operate as back light for the left eye perspectives of the color liquid crystal plate 10. The large convex lens 14 focuses the bright left half face images from the monochrome TV display 16 on a left face of each observer 12 so that the above backlight enters a left eye of each observer 12 selectively. This results in the left eye perspectives being seen only by the left eye of each observer 12. Likewise, the right eye perspectives are seen only by his right eye, whereby he can observe stereoscopic images without wearing any special glasses.

In the present embodiment, since the infrared TV camera 22 takes infrared images of each observer 12 by way of the color liquid crystal plate 10, the optical strength of the infrared images of each observer 12 varies under the influence of the stereo-pairs displayed on the color liquid crystal plate 10. In order to eliminate the above influence, the stereo-pairs signal 28 is input to the infrared TV camera 22 such that the aperture of lenses of the infrared TV camera 22 is automatically varied in accordance with the luminance of the stereo-pairs signal 28.

As described above, any observer who is illuminated by the infrared light source 36 from his obliquely right side and whose images are continuously taken by the infrared TV camera 22 by way of the color liquid crystal plate 10, large convex lens 14, half mirror 18 and diffuser 20 can observe stereoscopic images without wearing any special glasses provided that he is located within the area where the large convex lens 14 can focus the observers' optical images substantially on the screen of the monochrome TV display 16. He can also observe the stereoscopic images continuously while moving his location, unless he moves outside of the above area. Furthermore, plural persons can see the stereoscopic images simultaneously (FIG. 3).

With the present embodiment, since the observers' face images are taken by way of the large convex lens 14 between the large convex lens 14 and the monochrome TV display 16, the parallax between the resulting obsevers' face images displayed by the monochrome TV display 16 and the optical images of each observer, which are focused substantially on the screen of the monochrome TV display 16 by the large convex lens 14 can be reduced greatly, and accordingly, the gap therebetween can be reduced greatly, as compared with the conventional display wherein the observers' images are taken under the focusing means.

In order to improve the backlight effect of the monochrome TV display 16, a large convex lens, Fresnel convex lens, Selfoc lens or arrayed lens thereof may be disposed in front of the monochrome TV display 16. Alternatively, any combination of the above lenses will do.

The variation of the optical strength of the infrared images of each observer 12 may be corrected by another method of modulating the infrared observer's face images signal 38 obtained by the infrared TV camera 22 based on the stereo-pairs signal 28.

Furthermore, in order to improve the converging effect of the infrared light from the diffuser 20 to the infrared TV camera 20, a large convex lens, Fresnel convex lens, Selfoc lens or arrayed lens thereof may be disposed in front of the diffuser 20. Alternatively, any combination of the above lenses will do.

Figure 4:
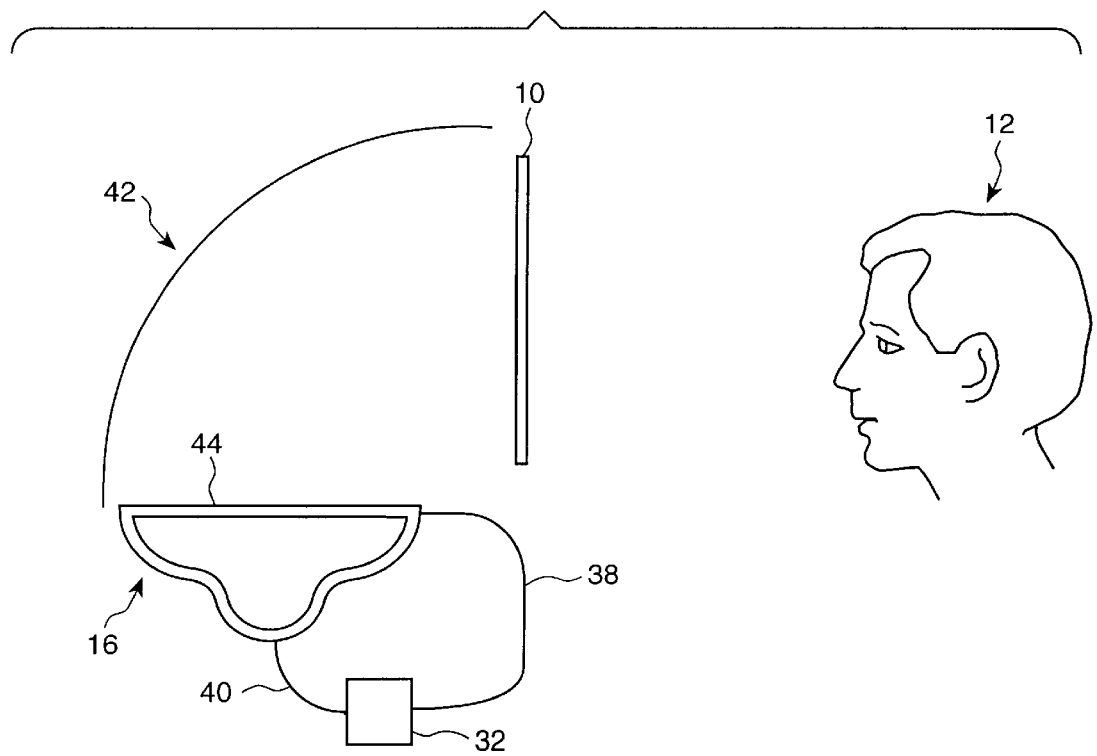
FIG. 4 is a schematic side view of a second embodiment of a stereoscopic display in accordance with the present invention.

FIG. 4 illustrates a second embodiment in accordance with the present invention. As shown, a concave mirror 42 is used as the focusing means, and an infrared sensing member 44 made of CCD or the like is used as the taking means. The infrared sensing member 44 can transmit visible light, and have sensitivity to the infrared light to output two-dimensional images based on the optical strength of the infrared light. The infrared sensing member 44 is disposed on or in the vicinity of the screen of a monochrome TV display 16 which is located in the position where the concave mirror 42 substantially focuses optical images of each observer 12 (namely, on the principle optical axis of the concave mirror 42). The infrared sensing member 44 is connected to a binary images forming circuit 32 and then is connected to a monochrome TV display 16.

The remainder of the structure of the display of the second embodiment is identical to that of the first embodiment. Accordingly, illustration and description thereof will be omitted. In the present embodiment, when light rays emitted from each observer who is illuminated by an infrared light source (not shown) and passing through the color liquid crystal plate 10 are reflected by the concave mirror 42, the infrared sensing member 44 transmits visible light rays and senses the infrared light rays to output an observer's face images signal 38 indicating the half face images composed of binary and inverted binary images of each observer to the binary images forming circuit 32. Then, the binary images forming circuit 32 forms a binary and inverted binary images signal 40 in synchronization with the stereoscopic synchronizing signal 34 (FIG. 1) and outputs it to the monochrome TV display 16. With the present embodiment, since the images of each observer are taken on or in the vicinity of the output screen of the monochrome TV display 16 by way of the concave mirror 42, the parallax between the obtained observers' face images displayed by the monochrome TV display 16 and the optical images of each observer which are projected on the screen of the monochrome TV display 16 by the concave mirror 42 can be reduced greatly, as compared with the conventional display wherein the observers' images are taken under the focusing means. Accordingly, the gap therebetween on the screen of the monochrome TV display 16 is hardly generated.

Figure 5:
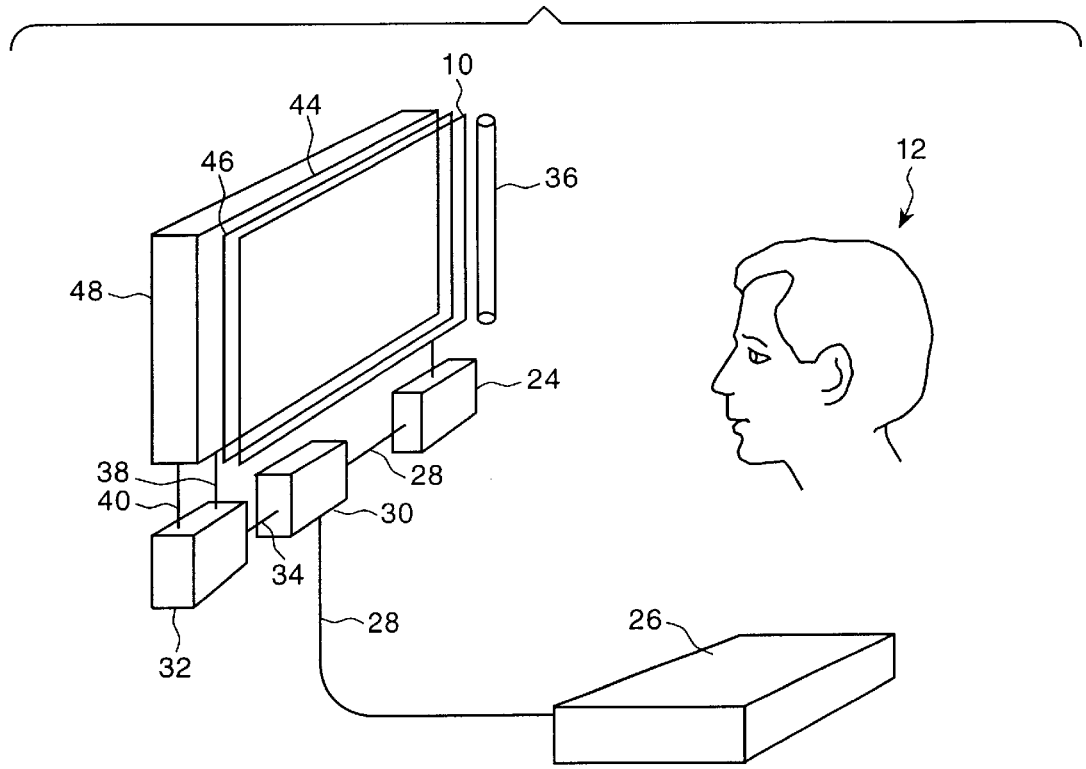
FIG. 5 is a schematic view of a third embodiment of a stereoscopic display in accordance with the present invention.
Figure 6:
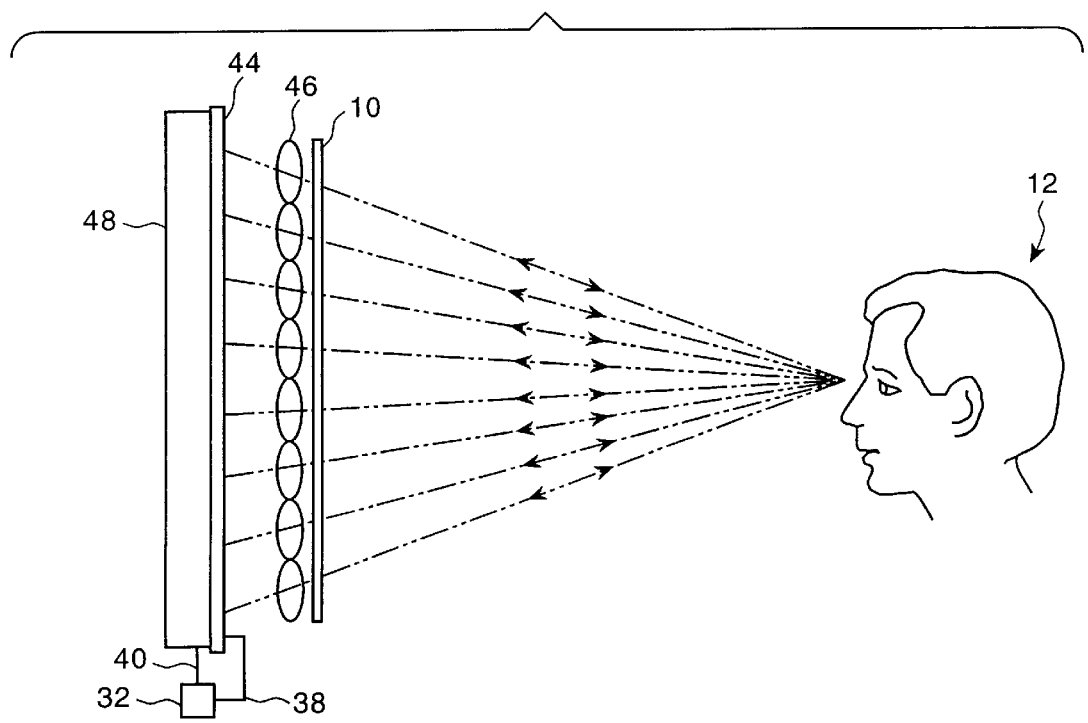
FIG. 6 is a side view illustrating vertical optical paths of the third embodiment.
Figure 7:
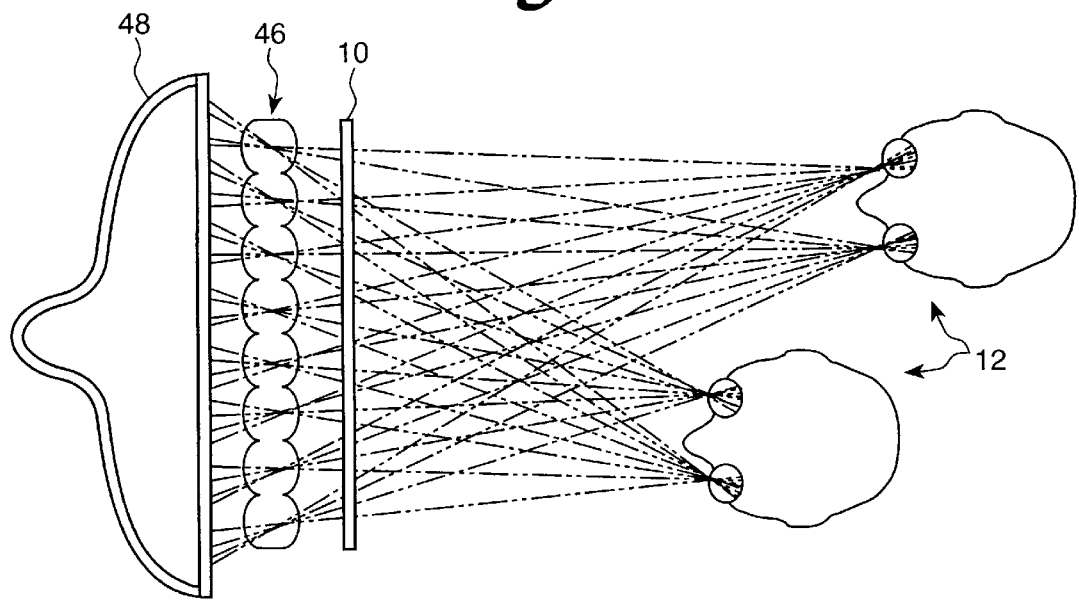
FIG. 7 is a plan view illustrating horizontal optical paths of the third embodiment.

FIGS. 5, 6 and 7 illustrate a third embodiment of the present invention. As shown, a color liquid crystal plate 10 which is identical to that of the first embodiment is disposed such that a screen thereof faces observers 12 like the first embodiment. The color liquid crystal plate 10 is connected to a video tape recorder 26 by way of a matrix circuit 24. Left and right eye perspectives composing stereo-pairs are input to the color liquid crystal plate 10 from the video tape recorder 26 in time-interlaced manner. An arrayed convex lens 46 is disposed behind the color liquid crystal plate 10. A monochrome liquid crystal TV display 48 is disposed such that a screen thereof faces the arrayed convex lens 46 on the plane on which the arrayed convex lens 46 substantially focuses optical images of each observer 12. A polarization plate as an analyzer is detached from the monochrome liquid crystal TV display 48. The polarization plate of the color liquid crystal plate 10 as a polarizer serves as an analyzer for the monochrome liquid crystal TV display 48.

Furthermore, an infrared sensing member 44 which is substantially identical to that of the second embodiment is disposed on or in the vicinity of the screen of the monochrome liquid crystal TV display 48 (namely, on the principle optical axis of the arrayed convex lens 46).

The remainder of the structure of the display of the third embodiment is identical to that of the first embodiment. Accordingly, illustration and description thereof will be omitted.

In operation, the infrared sensing member 44 senses arrayed infrared images of each observer 12 illuminated by the infrared light source 36 by way of the arrayed convex lens 46, and outputs an observer's images signal 38 to a binary images signal forming circuit 32. In the binary images signal forming circuit 32, the observer's images signal 38 is converted to a binary and inverted binary images signal 40 in synchronization with the stereoscopic synchronizing signal 34, and is input to the monochrome liquid crystal TV display 48 in time-interlaced manner, whereby the screen of the monochrome liquid crystal TV display 48 displays observers' face images composed of binary right half and left half images in time-interlaced manner so as to correspond to the arrayed convex lens 46.

With the present embodiment, similarly to the first embodiment, the right and left eye perspectives of the stereo-pairs, which are displayed by the color liquid crystal plate 10 in time-interlaced manner enter right and left eyes of each observer 12 selectively, by virtue of the arrayed convex lens 46, each perspectives being backlighted by the light emitted from the observers' binary right and left half face images on the monochrome liquid crystal TV display 48.

This results in the right eye perspectives being seen only by the right eye of each observer, likewise, the left eye perspectives being seen only by the left eye of each observer, whereby he can observe stereoscopic images without wearing any special glasses.

As described above, any observer who is illuminated by the infrared light source 36 from his obliquely right side can observe stereoscopic images without wearing any special glasses provided that he is located within the area where the arrayed convex lens 46 can focus the observer's optical images substantially on the screen of the monochrome liquid crystal TV display 48. He can also observe the stereoscopic images continuously while moving his location unless he moves outside of the above area. Furthermore, plural persons can see the stereoscopic images simultaneously (FIG. 7).

With the present embodiment, since the images of each observer are taken by way of the arrayed convex lens 46 on or in the vicinity of the screen of the monochrome liquid crystal TV display 48, the parallax between the obtained observers' face images and the optical images of each observer, which are projected on the screen of the monochrome liquid crystal TV display 48 by the arrayed convex lens 16, can be reduced greatly, as compared with the conventional display wherein the observers' images are taken under the focusing means. Accordingly, the gap therebetween is hardly generated on the screen of the monochrome liquid crystal TV display 48.

In the present embodiment, the monochrome liquid crystal TV display from which the analyzer is detached is used. Instead, the monochrome liquid crystal TV display provided with the analyzer will do. In this case, the infrared sensing member need to be disposed behind the analyzer.

In addition, the polarization axes of the polarizer of the color liquid crystal plate must be aligned or substantially aligned with those of the analyzer of the monochrome liquid crystal TV display 48. Alternatively, the polarizer of the color liquid crystal plate 38 may be detached therefrom.

The stereo-pairs displayed by the color liquid crystal plate 10 may cause the variation of the optical strength of the infrared images of each observer, which are sensed by the infrared sensing member. This variation must be corrected by modulating the infrared observer's images signal 38 based on the stereo-pairs signal 28.

Furthermore, in order to improve the back light effect of the monochrome liquid crystal TV display 48, a large convex lens, Fresnel convex lens, Selfoc lens or arrayed lens thereof may be disposed on a screen thereof. In addition, any arbitrary combination of the above lenses will do.

Figure 8:
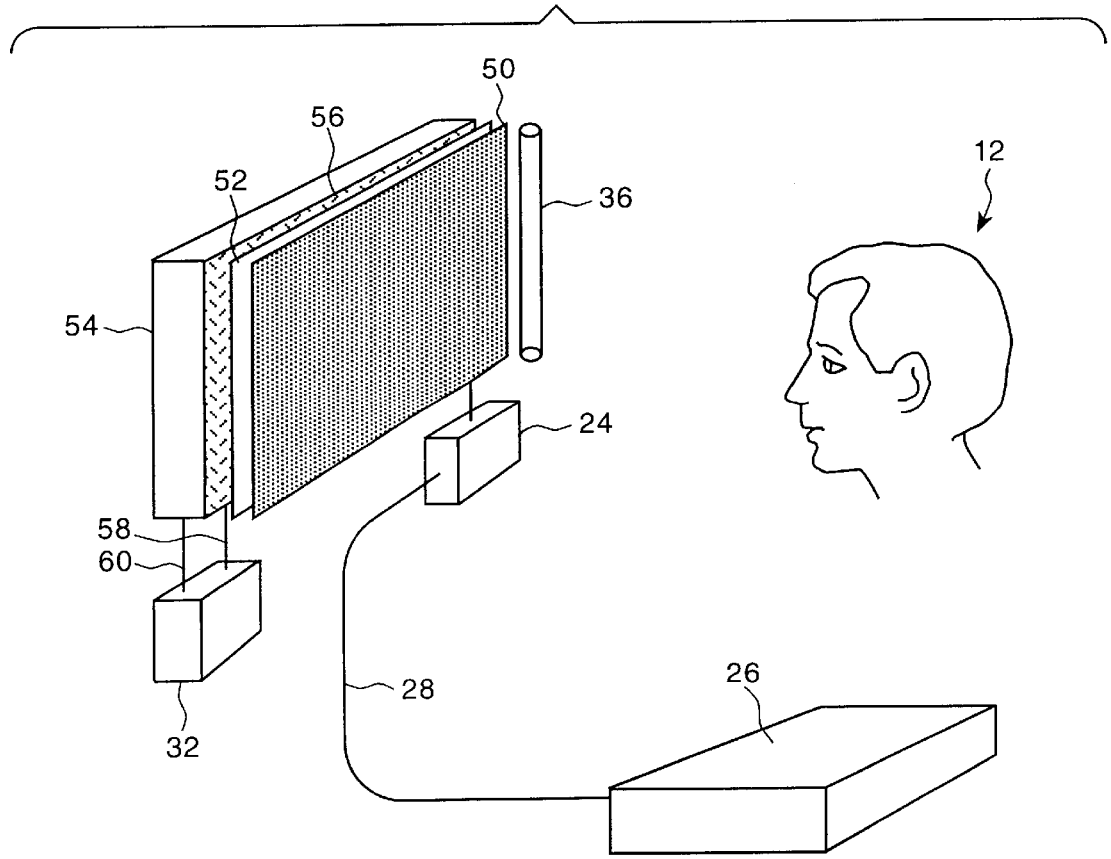
FIG. 8 is a schematic view of a fourth embodiment of a stereoscopic display in accordance with the present invention.
Figure 9:
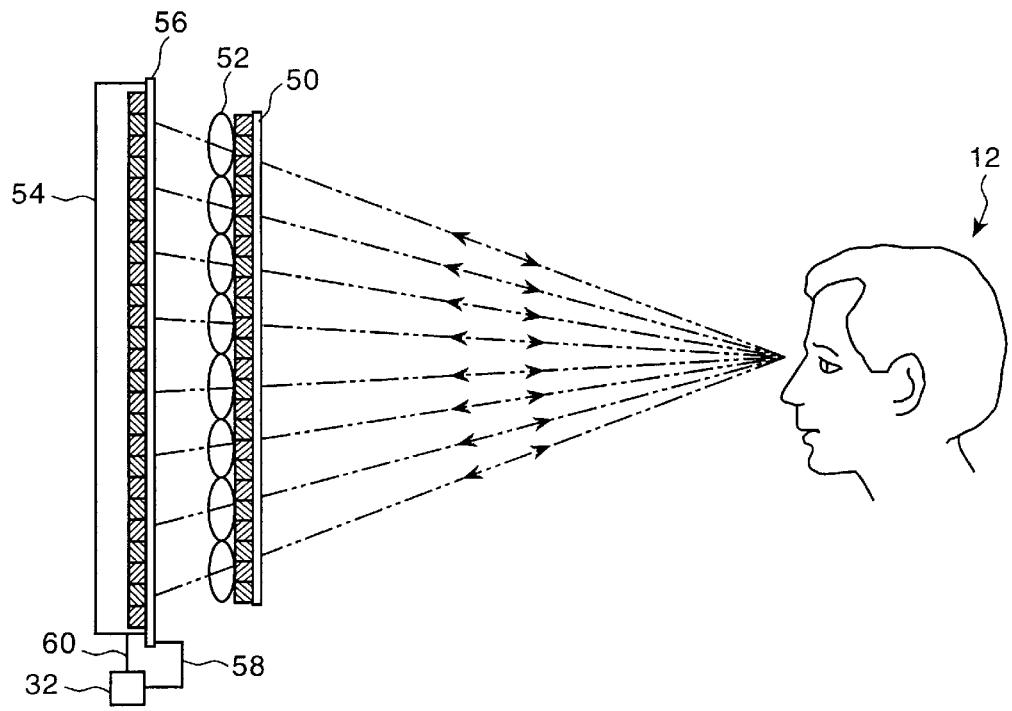
FIG. 9 is a side view illustrating vertical optical paths of the fourth embodiment.

FIGS. 8 and 9 illustrate a fourth embodiment in accordance with the present invention. As shown, a color liquid crystal plate 50 is disposed such that a screen thereof faces observers 12. The color liquid crystal plate 50 is connected to a video tape recorder 26 by way of a matrix circuit 24, whereby right and left eye perspectives composing a stereo-pairs signal 28 are input from the video tape recorder 26 to the color liquid crystal plate 50. Thus, the color liquid crystal plate 50 displays the right and left eye perspectives in spatial-multiplexing state. More specifically, alternate rows or columns of pixels (in FIG. 7, every row of pixels) of the color liquid crystal plate 50 display the right and left eye perspectives.

A polarizer of the color liquid crystal plate 50 has an arrangement that polarization axes thereof are oriented approximately 90° with respect to each other so as to correspond to the above-described row or column of pixels of the color liquid crystal plate 50, whereby right eye perspectives display row or column and left eye perspectives display row or column, each having polarization axes different from each other, are alternately arranged in the polarizer of the color liquid crystal plate 50.

An arrayed convex lens 52 is disposed behind the color liquid crystal plate 50. And a monochrome liquid crystal TV display 54 is disposed such that a screen thereof faces the arrayed convex lens 52 on the plane on which the observers' optical images are substantially focused by the arrayed convex lens 52. The monochrome liquid crystal TV display 54 has two polarization plates of which polarization axes are alternately oriented approximately 90° with respect to each other so as to correspond to rows or columns of pixels of the monochrome liquid crystal TV display 42 substantially in alignment with the opposed polarization axes of the polarizer of the color liquid crystal plate 50.

Furthermore, an infrared sensing member 56 is disposed on or in the vicinity of the screen of the monochrome liquid crystal TV display 54 like the third embodiment. An observers' face images signal 58 obtained by the infrared sensing member 56 is input to a binary images signal forming circuit 32 to be converted to a binary and inverted binary images signal. The circuit 32 outputs a composite signal 60 to the monochrome liquid crystal TV display 54 such that rows or columns of pixels thereof alternately display binary and inverted binary images in spatial-multiplexing state. This results in observers' face images, each being composed of binary right and left half face images, being displayed alternately by rows or columns of pixels of the monochrome liquid crystal TV display 54.

The infrared light source 36 and the binary images forming circuit 32 are adjusted such that the polarization axes of the rows or columns of pixels of the monochrome liquid crystal TV display 54, which display the left half face images, are substantially aligned with those of the left eye perspectives display rows or columns of the color liquid crystal plate 50 while the polarization axes of the rows or columns of pixels which display the right half face images are substantially aligned with those of the right eye perspectives display rows or columns of the color liquid crystal plate 50.

In operation, the light rays emitted from the observers' left half face images on the monochrome liquid crystal TV display 54, for example, are transmitted only by the left eye perspectives display rows or columns of the color liquid crystal plate 50, of which the polarization axes are substantially aligned with those of the light rays emitted from the observers' left half face images of the monochrome liquid crystal TV display 54, thereby serving as backlight for the left eye perspectives of the color liquid crystal plate 50. Since the left half face images, for example, are focused by the arrayed convex lens 52 on a left half face of each observer 12, the left eye perspectives which are backlighted by the light rays emitted from the observers' left half face images of the monochrome liquid crystal TV display 54 selectively enter a left eye of each observer 12. Likewise, the right eye perspectives displayed by the color liquid crystal plate 50 selectively enter a right eye of each observer 12.

Thus, each observer 12 can observe stereoscopic images. Furthermore, each observer 12 can observe stereoscopic images continuously while moving his observation position unless he is outside of the area described in the first embodiment. In addition, plural observers can observe stereoscopic images simultaneously like the first embodiment.

In the present embodiment, the infrared sensing member 56 is provided on or in the vicinity of the screen of the monochrome liquid crystal TV display 54 so that the observer's images can be taken by way of the arrayed convex lens 52. Accordingly, the parallax between the obtained observers' face images displayed by the monochrome liquid crystal TV display 54 and the observers' optical images projected on the screen of the monochrome liquid crystal TV display 54 can be reduced greatly, as compared with the conventional display wherein the taking means is provided under the focusing means. This results in the gap of these two images being hardly generated.

In the present embodiment, the polarization axes of both the analyzer of the monochrome liquid crystal TV display and the polarizer of the color liquid crystal plate, which respectively correspond to alternate rows or columns of pixels, are oriented approximately 90° with respect to each other. Alternatively, any other arrangement will do if the polarization axes corresponding to predetermined pixels are oriented approximately 90° with respect to each other. Such a film of crystals, liquid crystals or the like as to rotate the polarization axes of transmitted light approximately 90° may be bonded to a normal polarization plate.

Furthermore, instead of the monochrome liquid crystal TV display, any means capable of outputting two dimensional images including at least three primary colors, such as a plasma display, neon tubing display, solid state light emitting element, thin CRT or arrayed CRT, may be employed. In this case, like the present embodiment, Polarization plates need to be provided on the screen thereof such that two binary images of which the polarization axes are oriented approximately 90° with respect to each other are displayed in spatial-multiplexing state.

Instead of the monochrome liquid crystal TV display having the polarization plates, a monochrome liquid crystal TV display from which an analyzer is detached may be employed. In this case, the binary half face images and their inverted binary images need not be displayed on the screen of the monochrome liquid crystal TV display in spatial-multiplexing state. Either the binary half face images or their inverted binary half face images will do.

In the present embodiment, the stereo-pairs are input to the color liquid crystal TV display from the video tape recorder in time-parallel manner. Alternatively, two image signals may be input thereto in spatial-multiplexing manner.

In the present embodiment, the infrared sensing member 56 is disposed on or in the vicinity of the analyzer of the monochrome liquid crystal TV display. Alternatively, the infrared sensing member 56 may be disposed behind the analyzer of the monochrome liquid crystal TV display. In this case, the optical strength of the infrared observer's images obtained by the infrared sensing member 56 may vary under the influence of the stereo-pairs displayed on the color liquid crystal plate 50. Accordingly, the variation of the optical strength need to be corrected by modulating the observer's images signal 38 based on the stereo-pairs signal 28.

Furthermore, in order to improve the backlight effect of the monochrome liquid crystal TV display 54, a large convex lens, a Fresnel convex lens, a Selfoc lens, or arrayed lens thereof may be disposed on the screen of the monochrome liquid crystal TV display 54. Alternatively, any arbitrary combination thereof will do.

Figure 10:
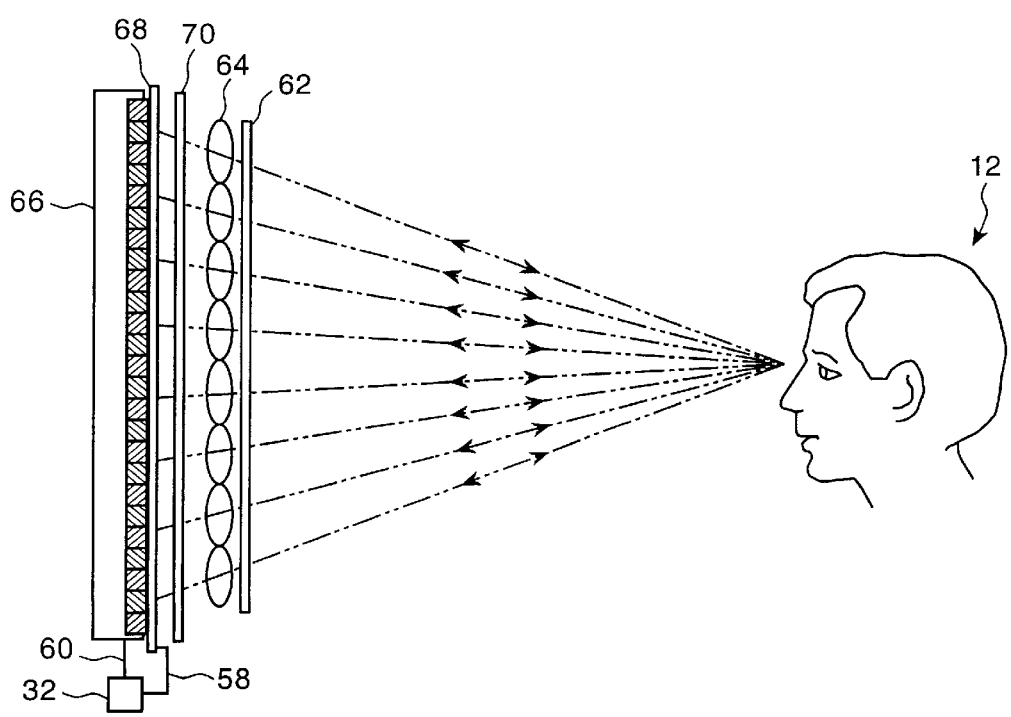
FIG. 10 is a side view illustrating vertical optical paths of a fifth embodiment.

FIG. 10 illustrates a fifth embodiment of the present invention. As shown, a color liquid crystal plate 62 substantially identical to the color liquid crystal plate 10 of the third embodiment is provided such that a screen thereof faces each observer 12. The color liquid crystal plate 62 is connected to a video tape recorder (not shown) which is substantially identical to the video tape recorder 26 of the third embodiment via a matrix circuit (not shown).

Left eye perspectives and right eye perspectives from the video tape recorder are alternately displayed by the color liquid crystal plate 62 in time-interlaced state.

An arrayed convex lens 64 is disposed behind the color liquid crystal plate 62. A monochrome liquid crystal TV display 66 substantially identical to the monochrome liquid crystal TV display 54 of the fourth embodiment is disposed in the position where the optical images of each observer 12 are substantially focused by the arrayed convex lens 64 such that a screen thereof faces the arrayed convex lens 64. The polarization axes of the analyzer are oriented approximately 90° with respect to each other so as to correspond to the rows or columns (in FIG. 10, rows) of pixels of the monochrome liquid crystal TV display 66. In addition, one of the above polarization axes is substantially aligned with the polarization axis of the polarizer of the color liquid crystal plate 62.

An infrared sensing member 68 substantially identical to that of the fourth embodiment is disposed on or in the vicinity of the analyzer of the monochrome liquid crystal TV display 66, and the infrared sensing member 68 is connected to a binary images signal forming circuit 32, and then, connected to the monochrome liquid crystal TV display 66. An infrared light source (not shown) is disposed on obliquely right side of each observer 12.

In addition, a spatial modulation element 70 is further disposed between the monochrome liquid crystal TV display 66 and the arrayed convex lens 64 for rotating the polarization axes of transmitted light rays approximately 90° so as to be synchronized with the time-interlaced display of the right and left eye perspectives on the color liquid crystal plate 62.

When each observer 12 is illuminated by the infrared light source, the infrared half face images emitted from each observer 12 pass the color liquid crystal plate 62, the arrayed convex lens 64 and the spatial modulation element 70, and are detected by the infrared sensing member 68 to input an observer's images signal 58 to a binary images signal forming circuit 32. The circuit 32 converts the observer's images signal 58 to a binary and inverted binary images signal, and outputs a composite signal 60 to the monochrome liquid crystal TV display 66 such that rows or columns of pixels thereof alternately display binary and inverted binary images in time-parallel state. This results in observers' face images, each being composed of binary right and left half face images, being displayed alternately by rows or columns of pixels of the monochrome liquid crystal TV display 66 in spatial-multiplexing state.

The polarization axes of the light rays emitted from a left half face images, for example of the monochrome liquid crystal TV display 66 and passing the spatial modulation element 70 are substantially aligned with those of the polarizer of the color liquid crystal plate 62 when the color liquid crystal plate 62 displays left eye perspectives, for example.

In operation, the polarization axes of the light rays emitted from a screen of the monochrome liquid crystal TV display 66 are rotated approximately 90° by the spatial modulation element 70 in time-interlaced manner. When the observers' left half face images emit light rays, for example, the polarization axes thereof are rotated approximately 90° by the spatial modulation element 70 substantially in alignment with those of the left eye perspectives display rows of the polarizer of the color liquid crystal plate 62. Accordingly, the light rays emitted from the observers' left half face images on the monochrome liquid crystal TV display 66 pass the left eye perspectives display rows of the color liquid crystal plate 62 and acts as back light selectively for the color liquid crystal plate 62. In this case, the observers' left half face images are focused substantially on a left half face of each observer 12 by the arrayed convex lens 64. This causes the light rays emitted from the observers' left half face images to be converged by the arrayed convex lens 64 and enter a left eye of each observer 12, whereby the left eye perspectives displayed by the color liquid crystal plate 62 are seen only by the left eye of each observer 12. Likewise, the right eye perspectives displayed by the color liquid crystal plate 62 are seen only by a right eye of each observer 12. Thus, each observer 12 can observe stereoscopic images. Furthermore, he can observe the stereoscopic images continuously if he moves his observation position, and plural observers can observe the stereoscopic images simultaneously like the preceding embodiments.

With the present embodiment, similarly to the fourth embodiment, the infrared sensing member 68 is provided on or in the vicinity of the screen of the monochrome liquid crystal TV display 66 so that the observer's images can be taken by way of the arrayed convex lens 64. Accordingly, the parallax between the obtained observers' face images displayed by the monochrome liquid crystal TV display 66 and the observers' optical images projected thereon can be reduced greatly, as compared with the conventional display wherein the taking means is provided under the focusing means. This results in the gap of these two images being hardly generated.

Figure 11:
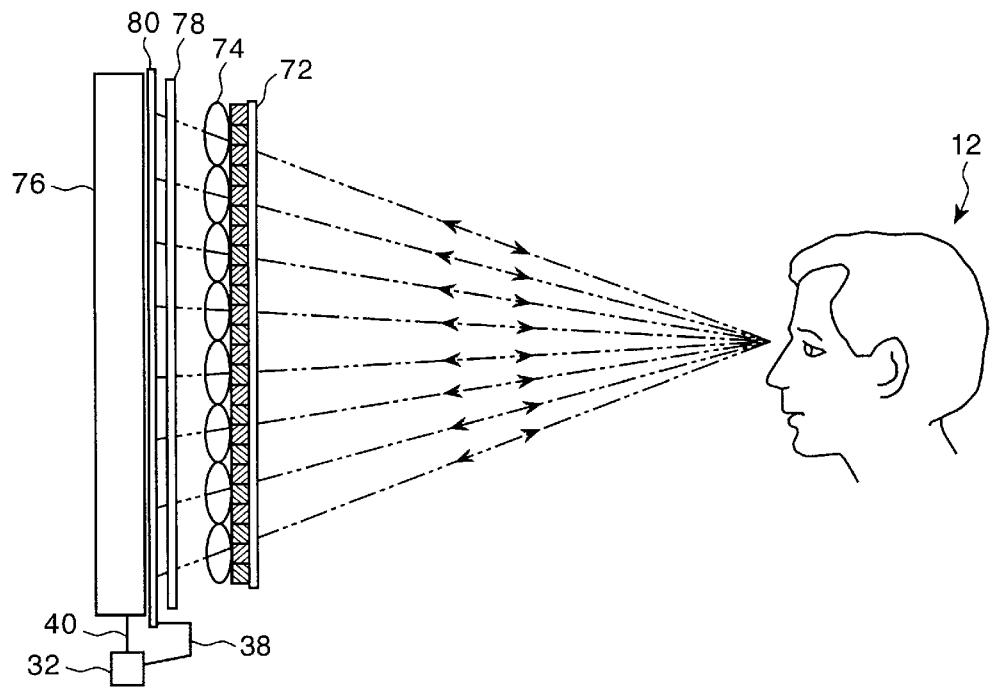
FIG. 11 is a side view illustrating vertical optical paths of a sixth embodiment of a stereoscopic display in accordance with the present invention.

FIG. 11 illustrates a sixth embodiment of the present invention. As shown, a color liquid crystal plate 72 substantially identical to the color liquid crystal plate 50 of the fourth embodiment is provided such that a screen thereof faces each observer 12. The color liquid crystal plate 72 is connected to a video tape recorder (not shown) which is substantially identical to the video tape recorder 26 of the fourth embodiment via a matrix circuit (not shown).

Alternate rows or columns of pixels (in FIG. 11, alternate rows of pixels) of the color liquid crystal plate 72 display right and left eye perspectives input from the video tape recorder in spatial-multiplexing and time-parallel state. A polarizer of the color liquid crystal plate 72 includes right and left eye perspectives display rows or columns of which polarization axes are oriented approximately 90° with respect to each other so as to correspond to the rows or columns of pixels of the color liquid crystal plate 72.

An arrayed convex lens 74 is disposed behind the color liquid crystal plate 72. A normal monochrome liquid crystal TV display 76 is disposed in the position where the optical images of each observer 12 are substantially focused by the arrayed convex lens 74 such that a screen thereof faces the arrayed convex lens 74. The polarization axes of the light rays emitting from the monochrome liquid crystal TV display 76 are substantially aligned with one of two polarization axes of the polarizer of the color liquid crystal plate 72.

An infrared sensing member 80 substantially identical to that of the third embodiment is disposed on or in the vicinity of the screen of the monochrome liquid crystal TV display 76, and the infrared sensing member 63 is connected to a binary images signal forming circuit 32, and then, connected to the monochrome liquid crystal TV display 76. An infrared light source (not shown) is disposed on obliquely right side of each observer 12.

In addition, a spatial modulation element 78 is further disposed between the monochrome liquid crystal TV display 76 and the arrayed convex lens 74 for rotating the polarization axes of transmitted light rays approximately 90°.

In operation, when each observer 12 is illuminated by the infrared light source, the infrared half face images emitted from each observer 12 pass the color liquid crystal plate 72, the arrayed convex lens 74 and the spatial modulation element 78, and are detected by the infrared sensing member 80 to input an observer's images signal 38 to a binary images signal forming circuit 32. The circuit 32 converts the observer's face images signal 38 to a binary and inverted binary images signal, and outputs a composite signal 40 to the monochrome liquid crystal TV display 76 in time-interlaced manner.

The spatial modulation element 78 is adjusted so as to be synchronized with the time-interlaced display of the binary and inverted binary images on the monochrome liquid crystal TV display 76 such that when the monochrome liquid crystal TV display 76 emits light from observer's left half image, for example, the polarization axis of the light passing the spatial modulation element 78 is substantially aligned with that of the left eye perspective display rows of the color liquid crystal plate 72.

The remainder of the structure of the display of the sixth embodiment is identical to that of the fourth embodiment. Accordingly, illustration and description thereof will be omitted.

In operation, the polarization axes of the light rays emitted from a screen of the monochrome liquid crystal TV display 76 in time-interlaced manner are rotated approximately 90° by the spatial modulation element 78. When the observers' left half face images emit light rays, for example, the polarization axes thereof are rotated approximately 90° by the spatial modulation element 78 substantially in alignment with those of the left eye perspectives display rows of the polarization plate of the color liquid crystal plate 72. Accordingly, the light rays emitted from the observers' left half face images on the monochrome liquid crystal TV display 76 pass the left eye perspectives display rows of the color liquid crystal plate 72 and acts as backlight selectively for the color liquid crystal plate 72. In this case, the observers' left half face images are focused substantially on a left half face of each observer 12 by the arrayed convex lens 74. This causes the light rays emitted from the observer's left half face images to be converged by the arrayed convex lens 74 and enter a left eye of each observer 12, whereby the left eye perspectives displayed by the color liquid crystal plate 72 are seen only by the left eye of each observer 12. Likewise, the right eye perspectives displayed by the color liquid crystal plate 72 are seen only by a right eye of each observer 12. Thus, each observer 12 can observe the stereoscopic images continuously if he moves his observation position, and plural observers can observe the stereoscopic images simultaneously like the preceding embodiments.

With the present embodiment, similarly to the third embodiment, the infrared observer's images can be taken on or in the vicinity of the screen of the monochrome liquid crystal TV display 76 by way of the arrayed convex lens 74. Accordingly, the parallax between the obtained observers' face images displayed by the monochrome liquid crystal TV display 76 and the observer's optical images projected thereon can be reduced greatly, as compared with the conventional device wherein the taking means is provided under the focusing means. This results in the gap between these two images being hardly generated.

Figure 12:
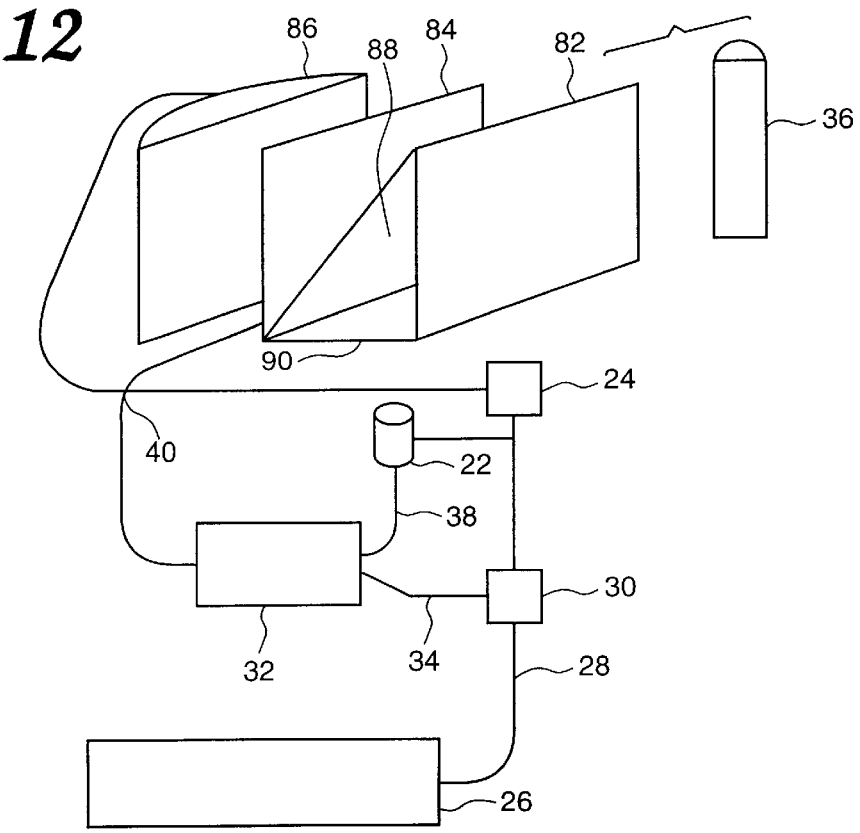
FIG. 12 is a schematic view of a seventh embodiment of a stereoscopic display in accordance with the present invention.
Figure 13:
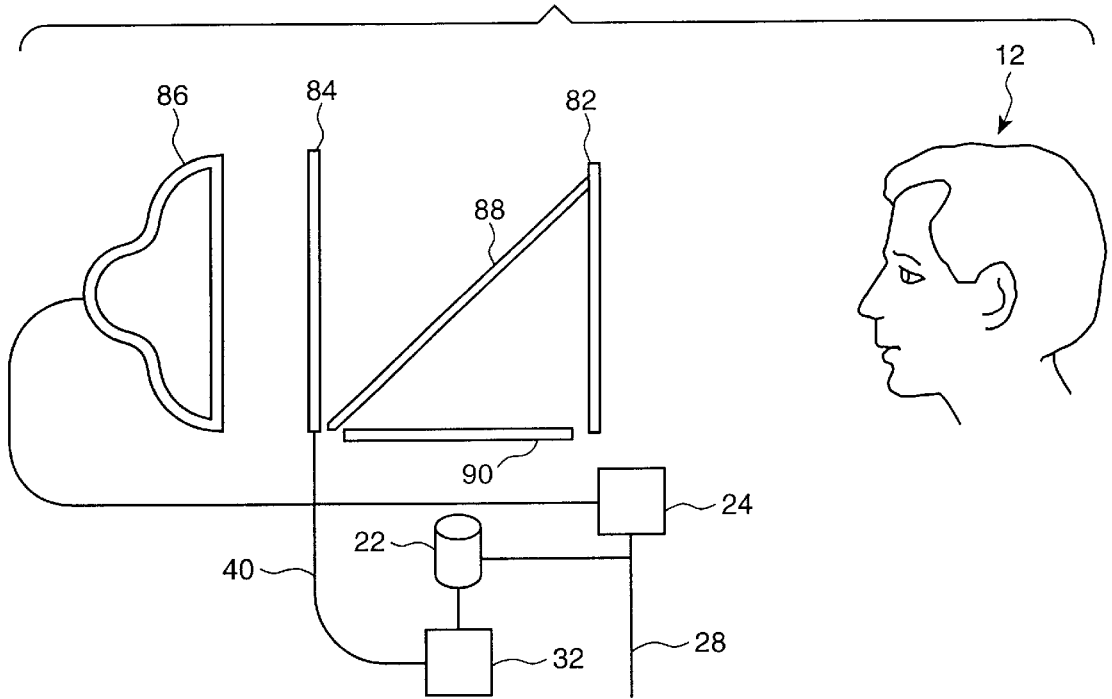
FIG. 13 is a schematic side view of the seventh embodiment.
Figure 14:
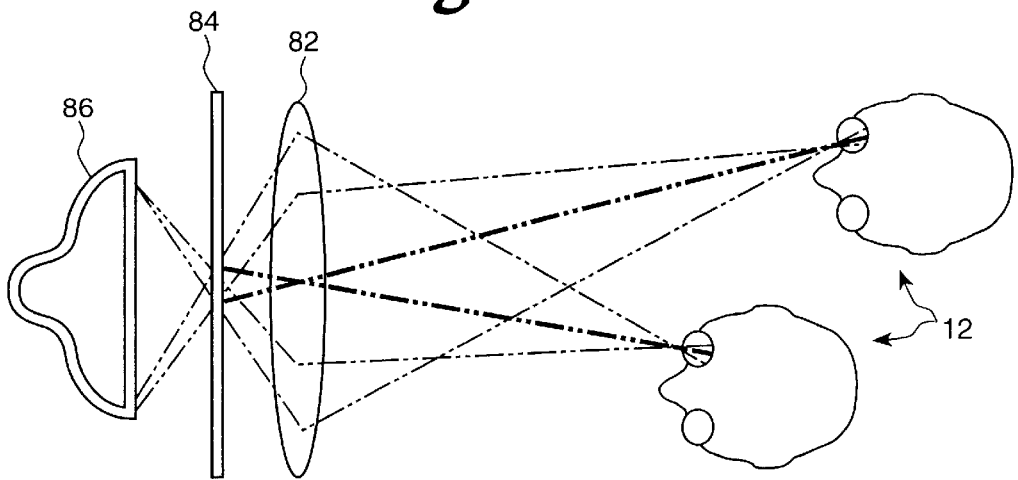
FIG. 14 is a plan view illustrating horizontal optical paths of the seventh embodiment.

FIGS. 12, 13 and 14 illustrate a seventh embodiment in accordance with the present invention. As shown, a large convex lens 82 is disposed such that a screen thereof faces observers 12.

A monochrome liquid crystal TV display 84 from which a back light is detached is disposed in the vicinity of the position where the large convex lens 82 substantially focuses optical images of each observer 12 such that a screen thereof faces the large convex lens 82. A color TV display 86 is disposed behind the monochrome liquid crystal TV display 84 such that a screen thereof faces the monochrome liquid crystal TV display 84.

A half mirror 88 which reflects infrared light but transmits visible light is disposed between the large convex lens 82 and the monochrome liquid crystal TV display 84. And a diffuser 90 is disposed in or in the vicinity of the position where infrared images of each observer, which are reflected by the half mirror 38 are focused. An infrared TV camera 22 for taking infrared images focused on the diffuser 90 is disposed so as to face the diffuser 90. Preferably, the infrared TV camera 22 is disposed on the principle optical axis of the large convex lens 82.

A matrix circuit 24 is connected to the color TV display 86 to drive pixels thereof. A video tape recorder 26 which outputs a stereo-pairs signal 28 is connected to the matrix circuit 24 by way of a stereoscopic synchronizing signal sampling circuit 30, whereby the stereo-pairs signal 28 is input to the matrix circuit 24.

Observers' face images taken by the infrared TV camera 22 are input to a binary images forming circuit 32 to drive pixels of the monochrome liquid crystal TV display 84 in synchronization with a stereoscopic synchronizing signal 34 output from the stereoscopic synchronizing signal sampling circuit 30. Furthermore, an infrared light source 36 is disposed on the obliquely right side of each observer 12.

The color TV display 86 serves as the stereo-pairs display means, the monochrome liquid crystal TV display 84 serves as the observers' face images display means, the large convex lens 82 serves as the focusing means, and the half mirror 88, diffuser 90 and infrared TV camera 22 serve as the taking means.

In operation, the stereo-pairs signal 28 from the video tape recorder 26 is input to the color TV display 86 by way of the stereoscopic synchronizing signal sampling circuit 30 and the matrix circuit 24, whereby the color TV display 86 displays inverted stereo-pairs, each composed of right and left eye perspectives in time-interlaced state.

Each observer 12 is illuminated by the infrared light source 36 from the obliquely right side thereof. The resulting infrared images of each observer 12 pass the large convex lens 82, and then are reflected by the half mirror 88, and focused on the diffuser 90. The infrared TV camera 22 continuously takes the infrared images focused on the diffuser 90, whereby half face images of each observer 12, of which right half faces are bright while left half faces are dark, are obtained.

The binary images forming circuit 32 outputs a binary and inverted binary images signal 40 based on an observer's face images signal 38 indicating the half face images of each observer 12 to the monochrome liquid crystal TV display 84 in time-interlaced manner in synchronization with the stereoscopic synchronizing signal 34 from the stereoscopic synchronizing signal sampling circuit 30, whereby the screen of the monochrome liquid crystal TV display 84 displays observers' face images composed of binary and inverted binary images in time-interlaced manner.

The monochrome liquid crystal TV display 84 is adjusted such that when the color TV display 86 displays left eye perspectives, for example, the observers' left half face images display regions of the screen of the monochrome liquid crystal TV display 84 are substantially transparent.

Accordingly, the left eye perspectives, for example, which are displayed by the color TV display 86 pass the substantially transparent observers' left half face images displayed by the monochrome liquid crystal TV display 84. These substantially transparent observers' left half face images are focused by the large convex lens 82 on a left face of each observer 12 so that the above left eye perspectives enter a left eye of each observer 12 selectively by means of the large convex lens 82 after passing the substantially transparent observers' left half face images. This results in the left eye perspectives being seen only by the left eye of each observer 12. Likewise, the right eye perspectives are seen only by his right eye, whereby he can observe stereoscopic images without wearing any special glasses.

As described above, any observer who is illuminated by the infrared light source 36 from his obliquely right side and is taken by the infrared TV camera 22 through the large convex lens 82, half mirror 88 and diffuser 90 can observe stereoscopic images without wearing any special glasses provided that he is located within the area where the large convex lens 82 can focus the observer's optical images substantially on the screen of the monochrome liquid crystal TV display 84. He can also observe the stereoscopic images continuously while moving his location, unless he moves outside of the above area. Furthermore, plural persons can see the stereoscopic images simultaneously (FIG. 14).

With the present embodiment, since the observers' face images are taken by way of the large convex lens 82, the parallax between the resulting observers' face images displayed by the monochrome liquid crystal TV display 84 and the optical images of each observer, which are projected on the screen of the monochrome liquid crystal TV display 84 by the large convex lens 82 can be reduced greatly, as compared with the conventional display wherein the observers' images are taken under the focusing means, and accordingly, the gap between the above two images is hardly generated on the screen of the monochrome liquid crystal TV display 84.

In order to improve the luminance of the stereo-pairs displayed by the color TV display 86, a large convex lens, Fresnel convex lens, Selfoc lens or arrayed lens thereof may be disposed on a screen of the color TV display 86. In addition, any combination of the above lenses will do.

Furthermore, in order to improve the converging effect of the infrared light from the diffuser 90 to the infrared TV camera 22, a large convex lens, Fresnel convex lens, Selfoc lens or arrayed lens thereof may be disposed on the diffuser 90 so as to face the infrared TV camera 22. In addition, any combination of the above lenses will do.

Figure 15:
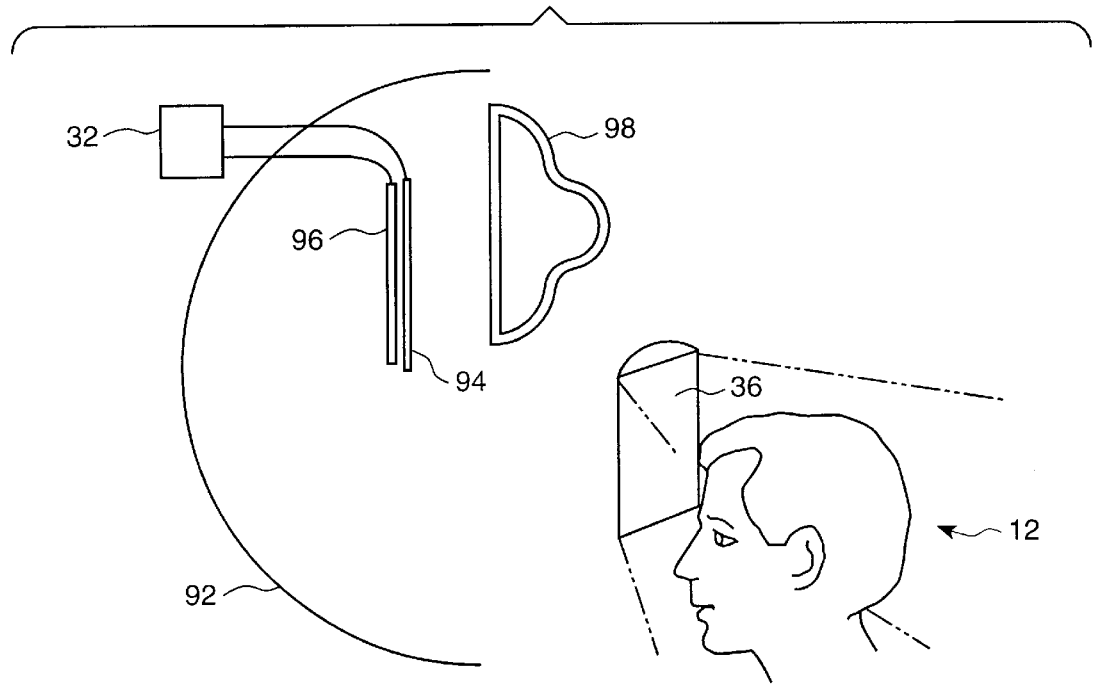
FIG. 15 is a schematic view of an eighth embodiment of a stereoscopic display in accordance with the present invention.

FIG. 15 illustrates an eighth embodiment in accordance with the present invention. As shown, a concave mirror 92 is used as the focusing means, and an infrared sensing member 96 made of CCD or the like is used as the taking means. The infrared sensing member 96 can transmit visible light, and have sensitivity to the infrared light to output two-dimensional images based on the optical strength of the infrared light. The infrared sensing member 96 is disposed on or in the vicinity of the screen of a monochrome liquid crystal TV display 94 provided with no backlight, which is located in the position where the concave mirror 92 substantially focuses optical images of each observer 12. The infrared sensing member 96 is connected to a binary images forming circuit 32 and then is connected to the monochrome liquid crystal TV display 94.

The remainder of the structure of the device of the eighth embodiment is identical to that of the seventh embodiment. Accordingly, illustration and description thereof will be omitted. In the present embodiment, when light rays emitted from each observer who is illuminated by an infrared light source (not shown) are reflected by the concave mirror 92, the infrared sensing member 96 transmits visible light rays and senses the infrared light rays to output an observer's images signal indicating the half face images composed of binary and inverted binary images of each observer to the binary images forming circuit 32. Then, the binary images forming circuit 32 forms a binary and inverted binary images signal in synchronization with the stereoscopic synchronizing signal and is input to the monochrome liquid crystal TV display 94. With the present embodiment, since the images of each observer are taken by way of the concave mirror 92, the parallax between the obtained observers' face images displayed by the monochrome liquid crystal TV display 94 and the optical images of each observer which are projected on the screen of the monochrome liquid crystal TV display 94 by the concave mirror 92 can be reduced greatly, as compared with the conventional display wherein the observers' images are taken under the focusing means, The gap between the above two images is hardly generated on the screen of the monochrome liquid crystal TV display 94.

Figure 16:
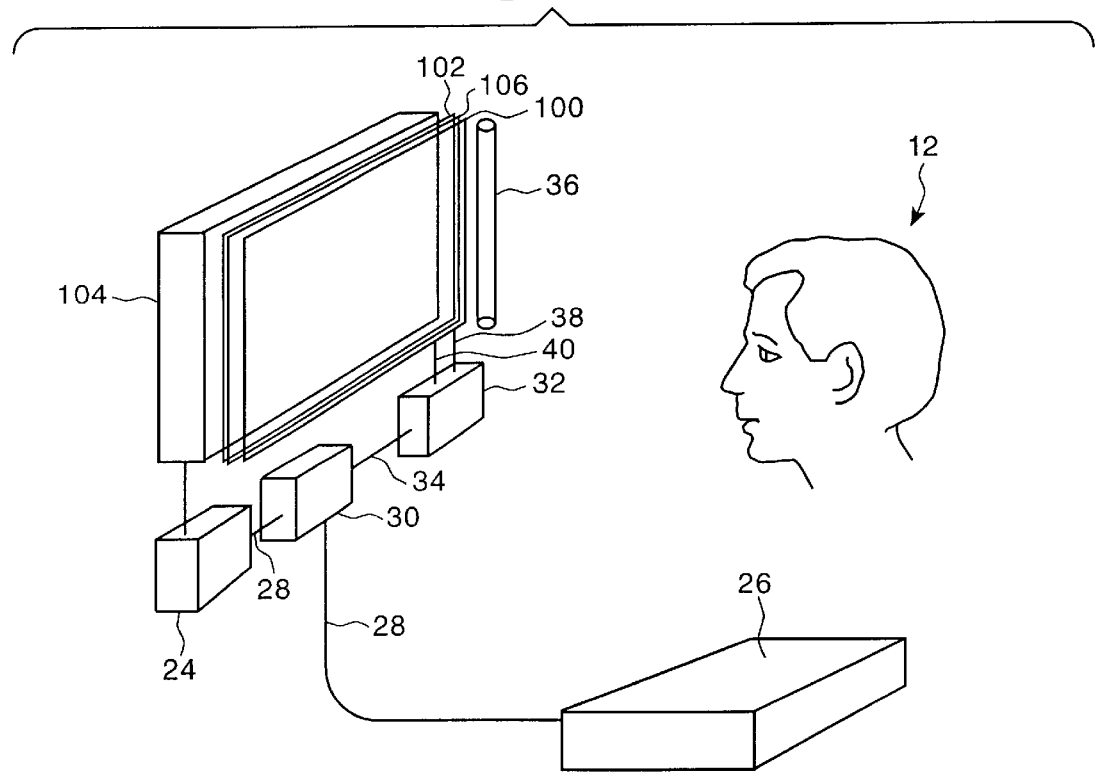
FIG. 16 is a schematic view of a ninth embodiment of a stereoscopic display in accordance with the present invention.
Figure 17:
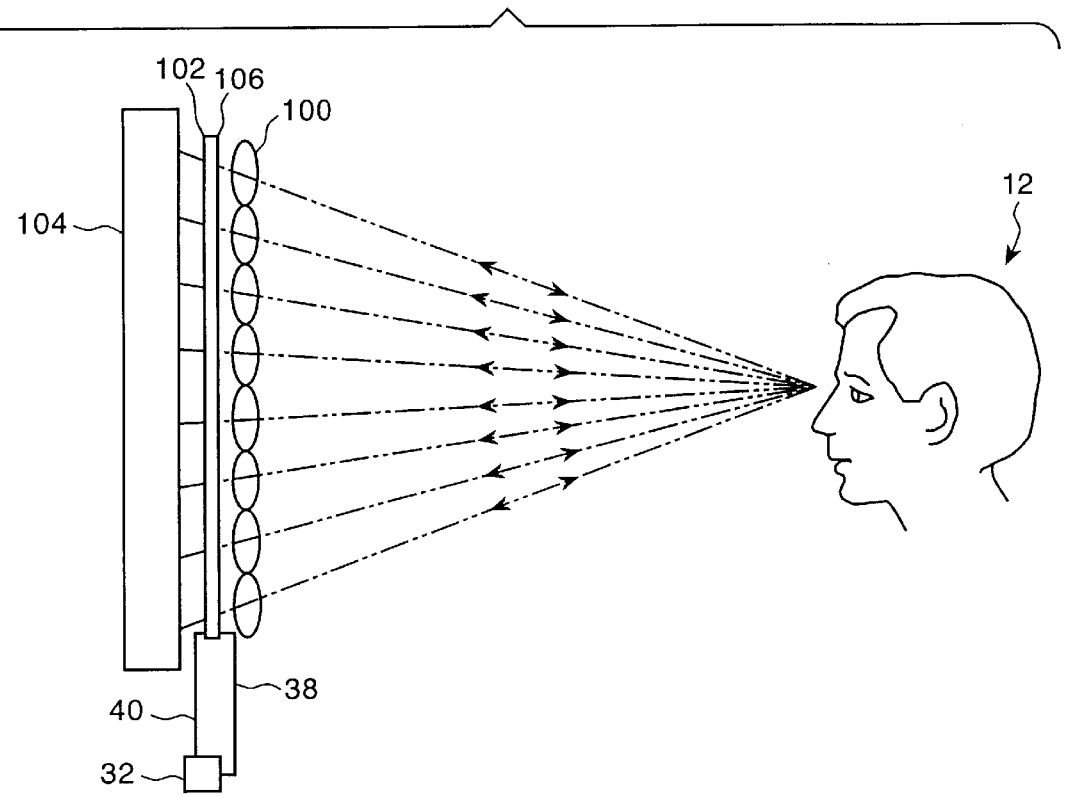
FIG. 17 is a side view illustrating vertical optical paths of the ninth embodiment.
Figure 18:
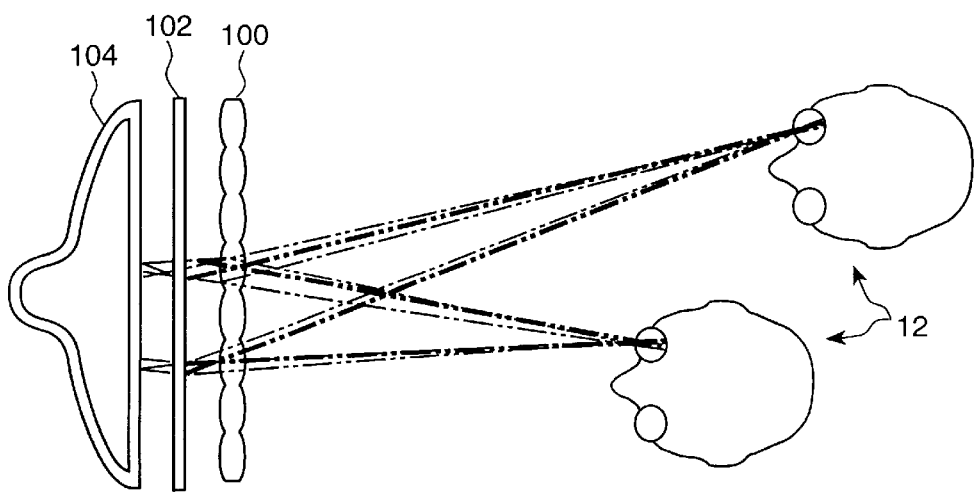
FIG. 18 is a plan view illustrating horizontal optical paths of the ninth embodiment.

FIGS. 16, 17 and 18 illustrate a ninth embodiment of the present invention. As shown, an arrayed convex lens 100 is disposed so as to face observers 12. A monochrome liquid crystal TV display 102 from which both a backlight and a polarizer are detached is disposed behind the arrayed convex lens 100 in the position where optical images of each observer 12 is substantially focused by the arrayed convex lens 100 such that a screen thereof faces the arrayed convex lens 100. A color liquid crystal TV display 104 is disposed behind the monochrome liquid crystal TV display 102, and is connected to a video tape recorder 26 by way of a stereoscopic synchronizing signal sampling circuit 30 and a matrix circuit 24. Left and right eye perspectives composing stereo-pairs are input to the color liquid crystal TV display 104 from the video tape recorder 26 in time-interlaced manner.

Furthermore, an infrared sensing member 106 which is substantially identical to those of the preceding embodiments is disposed on or in the vicinity of the screen of the monochrome liquid crystal TV display 102. An infrared light source 36 is disposed on the obliquely right side of the observers 12. The infrared sensing member 106 is connected to a binary images signal forming circuit 32 and then connected to the monochrome liquid crystal TV display 102.

In operation, a stereo-pairs signal 28 from the video tape recorder 26 is input to the color liquid crystal TV display 104 by way of the stereoscopic synchronizing signal sampling circuit 30 and the matrix circuit 24, whereby inverted stereo-pairs composed of right and left eye perspectives are displayed on the screen of the color liquid crystal TV display 104.

The infrared sensing member 106 senses arrayed infrared images of each observer 12 illuminated by the infrared light source 36 by way of the arrayed convex lens 100, and outputs a observer's images signal 38 to the binary images signal forming circuit 32. In the binary images signal forming circuit 32, the observer's images signal 38 is converted to a binary and inverted binary images signal 40 in synchronization with the stereoscopic synchronizing signal 34, and is input to the monochrome liquid crystal TV display 102 in time-interlaced manner, whereby the screen of the monochrome liquid crystal TV display 102 displays observers' face images composed of binary right half and left half face images in time-interlaced manner so as to correspond to the arrayed convex lens 100.

The monochrome TV display 100 is synchronized with the color liquid crystal TV display 104 such that when the color liquid crystal TV display 104 displays left eye perspectives, for example, the observers' left half face images display positions of the screen of the monochrome TV display 102 are substantially transparent.

Thus, the left eye perspectives, for example, which are displayed by the color liquid crystal TV display 104 pass the substantially transparent observers' left half face images displayed by the monochrome liquid crystal TV display 102. These substantially transparent observer's left half face images are focused by the arrayed convex lens 100 on a left face of each observer 12 so that the above left eye perspectives enter a left eye of each observer 12 selectively by means of the arrayed convex lens 100, after passing the substantially transparent observers' half face images. This results in the left eye perspectives being seen only by the left eye of each observer 12. Likewise, the right eye perspectives are seen only by his right eye, whereby he can observe stereoscopic images without wearing any special glasses.

As described above, any observer who is illuminated by the infrared light source 36 from his obliquely right side and is sensed by the infrared sensing member 106 by way of the arrayed convex lens 100 can observe stereoscopic images without wearing any special glasses provided that he is located within the area where the arrayed convex lens 100 can focus the observer's optical images substantially on the screen of the monochrome liquid crystal TV display 102. He can also observe the stereoscopic images continuously while moving his location, unless he moves outside of the above area. Furthermore, plural persons can observe the stereoscopic images simultaneously (FIG. 18).

With the present embodiment, since the observers' images are taken by way of the arrayed convex lens 100, the parallax between the resulting observers' face images displayed by the monochrome liquid crystal TV display 102 and the optical images of each observer, which are projected on the monochrome liquid crystal TV display 102 by the arrayed convex lens 100 can be reduced greatly, as compared with the conventional display wherein the observers' images are taken under the focusing means. Accordingly, the gap between two images on the screen of the monochrome liquid crystal TV display 102 is hardly generated.

In order to improve the luminance of the stereo-pairs displayed by the color liquid crystal TV display 104, a large convex lens, Fresnel convex lens, Selfoc lens or arrayed lens thereof may be disposed on a screen of the color liquid crystal TV display 104. In addition, any combination of the above lenses will do.

In case of the monochrome liquid crystal TV display provided with a polarizer being used, the polarization axes of the polarizer need to be substantially aligned with those of an analyzer of the color liquid crystal TV display.

Figure 19:
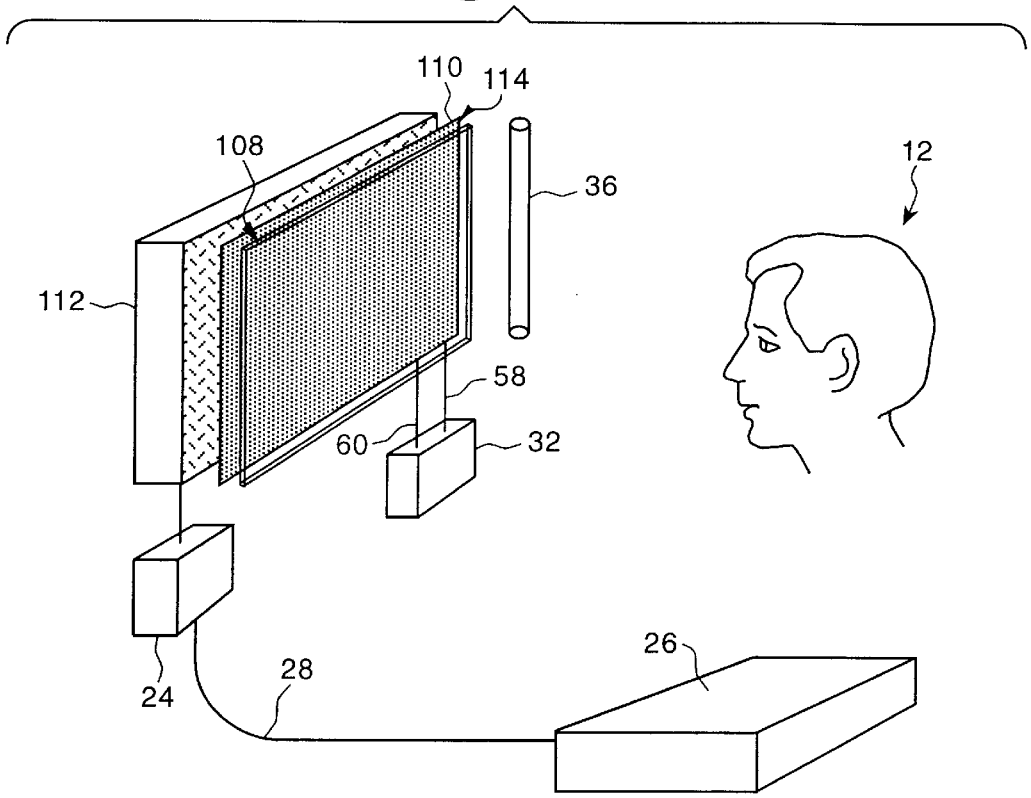
FIG. 19 is a schematic view of a tenth embodiment of a stereoscopic display in accordance with the present invention.
Figure 20:
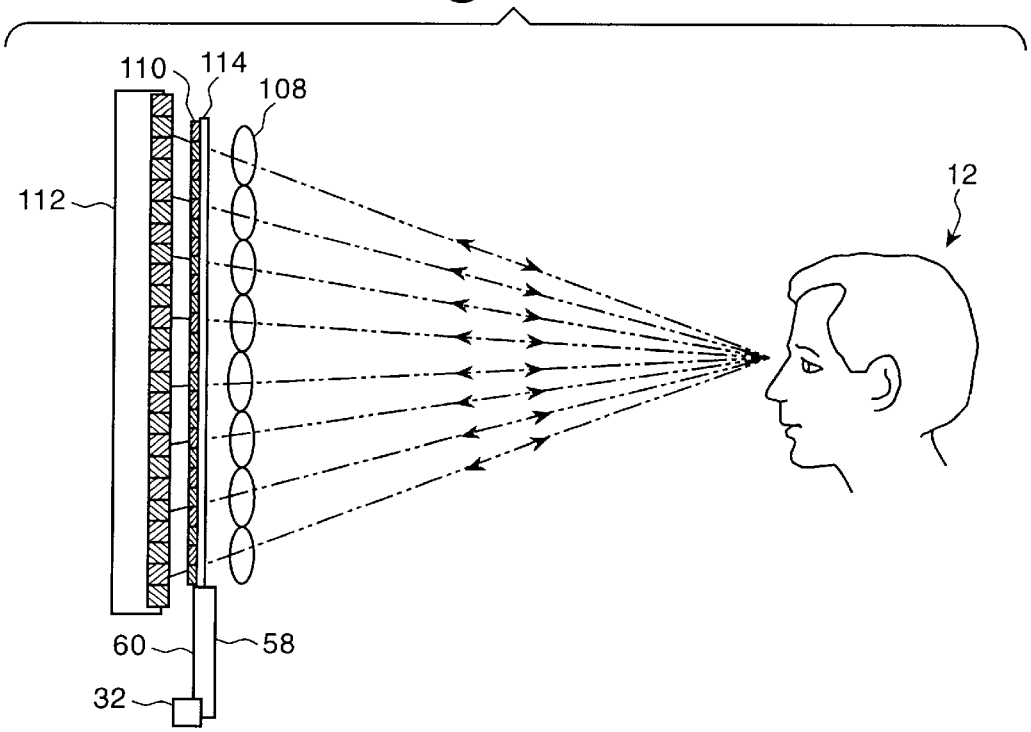
FIG. 20 is a side view illustrating vertical optical paths of the tenth embodiment.

FIGS. 19 and 20 illustrate a tenth embodiment in accordance with the present invention. As shown, an arrayed convex lens 108 is disposed so as to face observers 12. A monochrome liquid crystal TV display 110 from which a backlight is detached is disposed behind the arrayed convex lens 108 in the position where optical images of each observer 12 is substantially focused by the arrayed convex lens 108. The polarization axes of the analyzer of the monochrome liquid crystal TV display 110 are oriented approximately 90° with respect to each other so as to correspond to alternate rows or columns of pixels of the monochrome liquid crystal TV display 110. A color liquid crystal TV display 112 is disposed behind the monochrome liquid crystal TV display 110 such that a screen thereof faces the monochrome liquid crystal TV display 110, and is connected to a video tape recorder 26 by way of a matrix circuit 24. Left and right eye perspectives composing stereopairs are input to the color liquid crystal TV display 112 from the video tape recorder 26 in time-interlaced manner, whereby alternate rows or columns of pixels (in FIG. 20, every row of pixels) of the color liquid crystal TV display 112 displays the right and left eye perspectives in spatial-multiplexing state.

A polarizer of the color liquid crystal TV display 112 has an arrangement that polarization axes thereof are oriented approximately 90° with respect to each other so as to correspond to the above-described rows or columns of pixels of the color liquid crystal TV display 112, whereby right eye perspectives display row or column and left eye perspectives display row or column, each having polarization axes different from each other, are alternately arranged. The above two polarization axes are substantially aligned with corresponding two polarization axes of the analyzer of the monochrome liquid crystal TV display 110, respectively.

Furthermore, an infrared sensing member 114 is disposed on or in the vicinity of the screen of the monochrome liquid crystal TV display 110. The infrared sensing member 114 is connected to a binary images signal forming circuit 32, and then connected to the monochrome liquid crystal TV display 110.

In operation, a stereo-pairs signal 28 from the video tape recorder 26 is input to the color liquid crystal TV display 112 by way of the matrix circuit 24, whereby inverted stereo-pairs composed of right and left eye perspectives are displayed on the screen of the color liquid crystal TV display 112.

The infrared sensing member 114 senses arrayed infrared images of each observer 12 illuminated by the infrared light source 36 by way of the arrayed convex lens 108, and outputs an observer's images signal 58 to the binary images signal forming circuit 32. In the binary images signal forming circuit 32, the observer's images signal 58 is converted to a binary and inverted binary images signal 60 and is input to the monochrome liquid crystal TV display 110 in time-parallel manner, whereby alternate rows and columns of pixels of the screen of the monochrome liquid crystal TV display 110 display observers' face images composed of binary right and left half face images in spatial-multiplexing manner.

The infrared light source 36 and the binary images signal forming circuit 32 are adjusted such that the polarization axis of the rows or columns where observers' left half face images are transparent is substantially aligned with that of the left eye perspective display rows or columns of the color liquid crystal TV display 112 while the polarization axis of the rows or columns where observers' right half face images are transparent is substantially aligned with that of the right eye perspective display rows or columns of the color liquid crystal TV display 112.

As described above, the polarization axis of the observers' left half face images display positions is oriented approximately 90° with respect to that of the observers' right half face images display positions. Accordingly, the left eye perspectives, for example, displayed by the color liquid crystal TV display 112, of which the polarization axis is substantially aligned with that of the observers' left half face images display positions of the screen of the monochrome liquid crystal TV display 110, pass the transparent observers' left half face images of the monochrome liquid crystal TV display 110. These transparent observers' Left half face images are focused by the arrayed convex lens 108 on a left face of each observer 12 so that the above left eye perspectives enter a left eye of each observer 12 selectively by means of the arrayed convex lens 108, after passing the observers' left half face images of the monochrome liquid crystal TV display 110. This results in the left eye perspectives being seen only by the left eye of each observer 12. Likewise, the right eye perspectives are seen only by his right eye, whereby he can observe stereoscopic images without wearing any special glasses.

Any observer can observe stereoscopic images continuously provided that the conditions described in the ninth embodiment are all fulfilled. In addition, plural observers can observe the stereoscopic images simultaneously.

With the present embodiment, since the observers' face images are taken by way of the arrayed convex lens 108, the parallax between the resulting observers' face images displayed by the monochrome liquid crystal TV display 110 and the optical images of each observer, which are projected on the screen of the monochrome liquid crystal TV display 110 by the arrayed convex lens 108, can be reduced greatly, as compared with the conventional display wherein the observer's images are taken under the focusing means.

In order to improve the luminance of the stereo-pairs displayed by the color liquid crystal TV display 112, a large convex lens, Fresnel convex lens, Selfoc lens or arrayed lens thereof may be disposed on a screen of the color liquid crystal TV display 112. In addition, any combination of the above lenses will do.

In the present embodiment, the analyzer of the monochrome liquid crystal TV display, and two polarization plates of the color liquid crystal TV display are arranged such that the polarization axes corresponding to alternate rows or columns of pixels are oriented approximately 90° with respect to each other. Alternatively, any other arrangement will do if the polarization axes corresponding to predetermined rows or columns of pixels are oriented approximately 90° with respect to each other. For example, a film of crystals, liquid crystals or the like may be bonded to the polarization plates, respectively.

Furthermore, instead of the color liquid crystal TV display, a plasma display, neon tubing display, solid state light emitting element, thin CRT or arrayed CRT may be employed.

In the present embodiment, the stereo-pairs are input to the color liquid crystal TV display 112 from the video tape recorder in time-interlaced manner. Alternatively, two image signals or any other image signal capable of forming the stereo-pairs signal will do.

Figure 21:
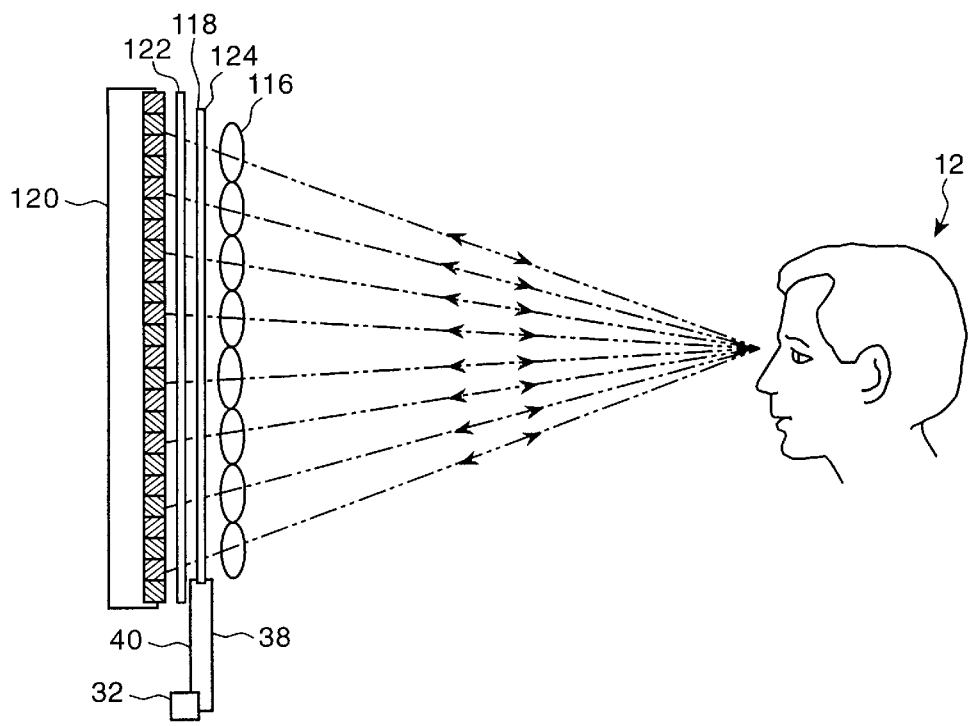
FIG. 21 is a side view illustrating vertical optical paths of an eleventh embodiment of a stereoscopic display in accordance with the present invention.

FIG. 21 illustrates an eleventh embodiment of the present invention. As shown, an arrayed convex lens 116 is disposed so as to face observers 12. A monochrome liquid crystal TV display 118 provided with no backlight is disposed behind the arrayed convex lens 116 in the position where the arrayed convex lens 116 substantially focuses optical images of each observer 12 such that a screen of the display 118 faces the arrayed convex lens 116. A color liquid crystal TV display 120 identical to the color liquid crystal TV display 112 of the tenth embodiment is disposed behind the monochrome liquid crystal TV display 118, and is connected to a video tape recorder (not shown) by way of a matrix circuit (not shown). Right and left eye perspectives composing stereo-pairs are input from the video tape recorder to the color liquid crystal TV display 112 in time-interlaced manner so that alternate rows or columns of pixels of the color liquid crystal TV display 120 (in FIG. 21, rows of pixels) display inverted right and left eye perspectives in spatial-multiplexing state.

Furthermore, an infrared sensing member 124 is disposed on or in the vicinity of the monochrome liquid crystal TV display 118, and an infrared light source (not shown) is disposed on the obliquely right side of the observers 12. The infrared sensing member 124 is connected to a binary images signal forming circuit 32 and then is connected to the monochrome liquid crystal TV display 118.

The infrared sensing member 124 senses arrayed infrared images of observers illuminated by the infrared light source from the obliquely right side thereof by way of the arrayed convex lens 116, and outputs an observer's images signal 38 to the binary images signal forming circuit 32. In the binary image signal forming circuit 32, the observer's images signal 38 is converted to a binary and inverted binary images signal 40. The signal 40 is input to the monochrome liquid crystal TV display 118 in time-interlaced manner, whereby binary left and right half face images of each observer are displayed on the screen of the monochrome liquid crystal TV display 118 in time-interlaced state so as to correspond to the arrayed convex lens 116.

Furthermore, a spatial modulation element 122 is disposed between the color liquid crystal TV display 120 and the monochrome liquid crystal TV display 118 for rotating the polarization axes of the light transmitting the element 122 approximately 90° in synchronization with the time-interlaced display of the monochrome liquid crystal TV display 118.

The spatial modulation element 122 is adjusted such that when the observers' left half face images display positions of the screen of the monochrome liquid crystal TV display 118 are substantially transparent, the polarization axis of the light rays emitted from the left eye perspectives display rows of the color liquid crystal TV display 120 and transmitted by the spatial modulation element 122 is substantially aligned with that of the monochrome liquid crystal TV display 118 and such that when the observers' right half face images display positions of the screen of the monochrome liquid crystal TV display 118 are substantially transparent, the polarization axis of the light rays emitted from the right eye perspectives display rows of the color liquid crystal TV display 120 and transmitted by the spatial modulation element 122 is substantially aligned with that of the monochrome liquid crystal TV display 118.

In operation, the polarization axes of the light rays emitted from the screen of the color liquid crystal TV display 120 in time-interlaced state are rotated approximately 90° by the spatial modulation element 122. Since the polarization axes of the light rays emitted from the left eye perspectives display rows of the color liquid crystal TV display 120 are oriented approximately 90° with respect to those of the light rays emitted from the right eye perspectives display rows thereof, when the observers' left half face images display positions, for example, of the screen of the monochrome liquid crystal TV display 118 are transparent, only the light rays emitted from the left eye perspectives display rows of the color liquid crystal TV display 120 and transmitted by the spatial modulation element 122 pass the observers' left half face images display positions of the monochrome liquid crystal TV display 118. Since these observers' left half face images, for example, of the monochrome liquid crystal TV display 118 are focused substantially on a left half face of each observer 12 by the arrayed convex lens 116, the left eye perspectives displayed by the color liquid crystal TV display 120 pass the spatial modulation element 122 and the monochrome liquid crystal TV display 118, are converged by the arrayed convex lens 116, and enter a left eye of each observe 12. Thus, the left eye perspectives displayed by the color liquid crystal TV display 120 are seen only by the left eye of each observer 12. Likewise, the right eye perspectives displayed by the color liquid crystal TV display 120 are seen only by a right eye of each observer 12. Accordingly, like the preceding embodiments, each observer 12 can observe stereoscopic images, he can observe the stereoscopic images continuously if he moves his observation position, and plural persons can observe the stereoscopic images simultaneously.

Figure 22:
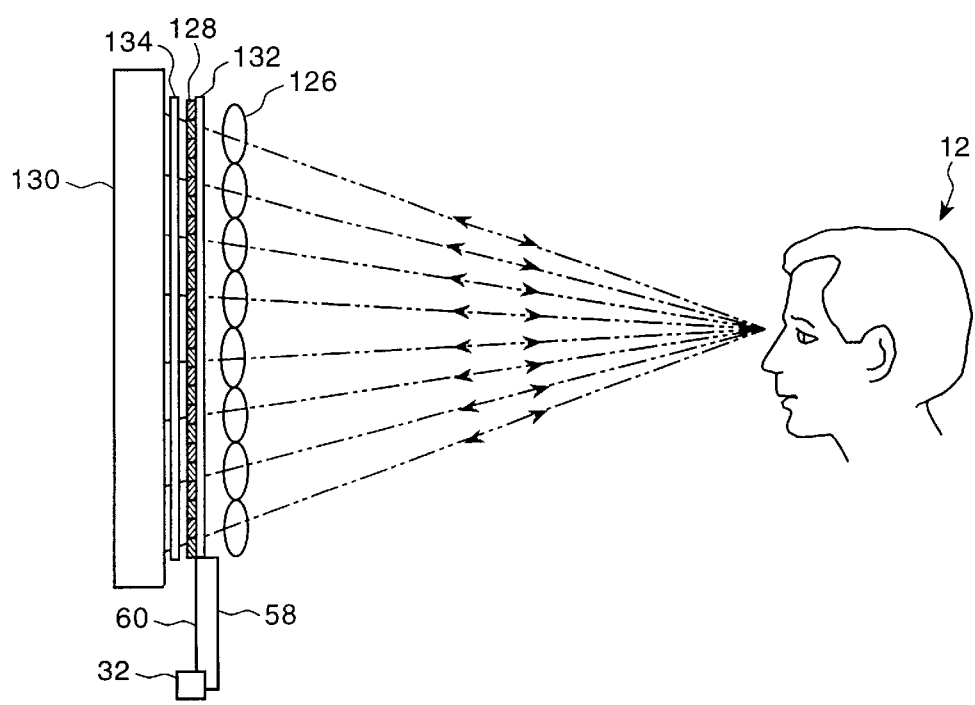
FIG. 22 is a side view illustrating vertical optical paths of a twelveth embodiment of a stereoscopic display in accordance with the present invention.

FIG. 22 illustrates a twelfth embodiment of the present invention. As shown, an arrayed convex lens 126 is disposed so as to face observers 12. A monochrome liquid crystal TV display 128 provided with no backlight, which is identical to the monochrome liquid crystal TV display 110 of the tenth embodiment, is disposed behind the arrayed convex lens 126 in the position where the arrayed convex lens 126 substantially focuses optical images of each observer 12 such that a screen thereof faces the arrayed convex lens 126. A color liquid crystal TV display 130 identical to the color liquid crystal TV display 104 of the ninth embodiment is disposed behind the monochrome liquid crystal TV display 128.

An infrared sensing member 132 is further disposed on or in the vicinity of the screen of the monochrome liquid crystal TV display 128, and an infrared light source (not shown) is disposed on the obliquely right side of the observers 12. The infrared sensing member 132 is connected to a binary images signal forming circuit 32, and then connected to a monochrome liquid crystal TV display 128.

A stereo-pairs signal output from a video tape recorder (not shown) is input to the color liquid crystal TV display 130 by way of a matrix circuit (not shown), whereby inverted stereo-pairs composed of right and left eye perspectives are displayed in time-interlaced state.

The infrared sensing member 132 outputs an observer's images signal 58 to the binary images signal forming circuit 32. Arid the circuit 32 converts the observer's images signal 58 to a binary and inverted binary images signal 60, and outputs it to the monochrome liquid crystal TV display 128 such that alternate rows or columns of pixel thereof display binary and inverted binary images.

Furthermore, a spatial modulation element 134 is disposed between the color liquid crystal TV display 130 and the monochrome liquid crystal TV display 128 for rotating the polarization axes of light rays emitted from the color liquid crystal TV display 130 approximately 90° in synchronization with the time-interlaced display of the color liquid crystal TV display 130.

The spatial modulation element 134 is adjusted such that when the color liquid crystal TV display 130 displays the left eye perspectives, the polarization axis of the light rays transmitted by the spatial modulation element 134 is substantially aligned with that of the rows of the screen of the monochrome liquid crystal TV display 128, of which observers' left half face images display positions are substantially transparent and such that when the color liquid crystal TV display 130 displays the right eye perspectives, the polarization axis of the light rays transmitted by the spatial modulation element 134 is substantially aligned with that of the rows of the screen of the monochrome liquid crystal TV display 128, of which observers' right half face images display positions are substantially transparent.

In operation, the polarization axes of the light rays emitted from the screen of the color liquid crystal TV display 130 in time-interlaced state are rotated approximately 90° by the spatial modulation element 134. Since the polarization axis of the light rays emitted from the left half face images display positions of the monochrome liquid crystal TV display 128 and transmitted by the spatial modulation element 134 are oriented approximately 90° with respect to those of the light rays emitted from the right half face images display positions of the monochrome liquid crystal TV display 128 and transmitted by the spatial modulation element 134, when the color liquid crystal TV display 130 displays the left eye perspectives, for example, only the light rays emitted from the screen of the color liquid crystal TV display 130 and transmitted by the spatial modulation element 134 pass the observers' left half face images display positions of the monochrome liquid crystal TV display 128. Since these observers' left half face images, for example, of the monochrome liquid crystal TV display 128 are focused substantially on a left half face of each observer 12 by the arrayed convex lens 126, the left eye perspectives displayed by the color liquid crystal TV display 130 pass the spatial modulation element 134 and the monochrome liquid crystal TV display 128, are converged by the arrayed convex lens 126, and enter a left eye of each observer 12. Thus, the left eye perspectives displayed by the color liquid crystal TV display 130 are seen only by the left eye of each observer 12. Likewise, the right eye perspectives displayed by the color liquid crystal TV display 130 are seen only by a right eye of each observer 12. Accordingly, like the preceding embodiments, each observer 12 can observe stereoscopic images, he can observe the stereoscopic images continuously if he moves his observation position, and plural persons can observe the stereoscopic images simultaneously.

Figure 23:
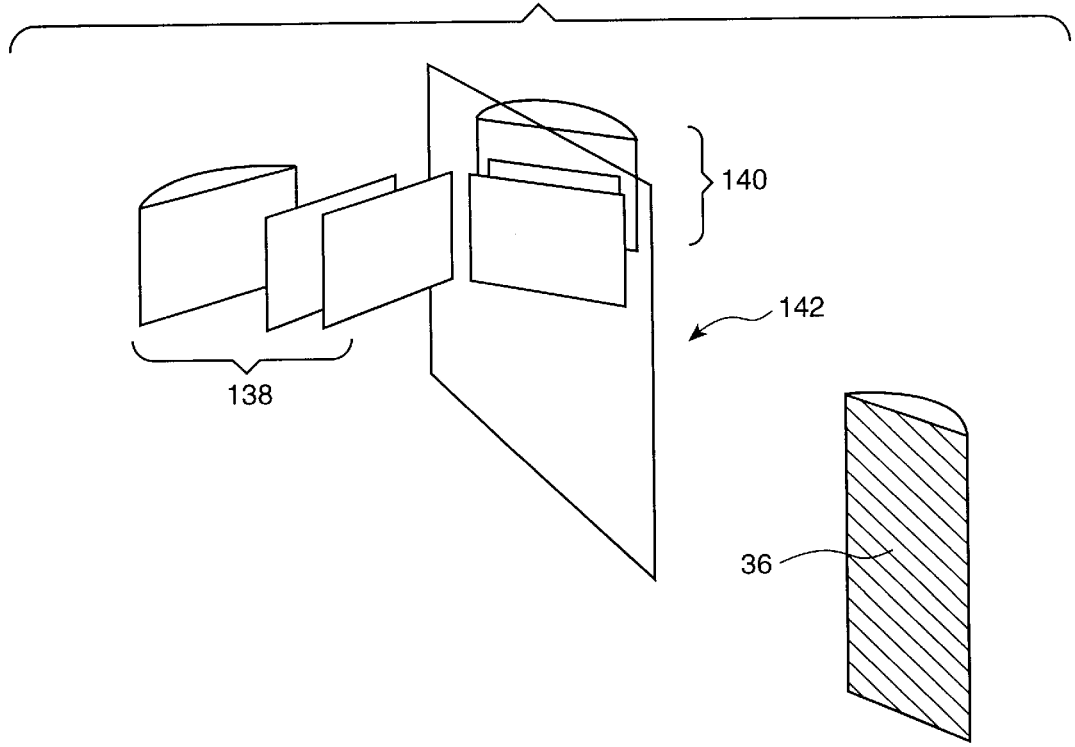
FIG. 23 is a schematic view of a thirteenth embodiment of a stereoscopic display in accordance with the present invention.

FIG. 23 illustrates a thirteenth embodiment of the present invention. As shown, two stereoscopic displays 138 and 140, which correspond to those of one of preceding embodiments, are arranged side by side in a horizontal direction. A half mirror 142 is interposed between the two displays 138 and 140. An infrared light source 36 is provided on the obliquely right side of observers (not shown).

With the present embodiment, the stereo-pairs display means of the display 138 displays right eye perspectives, and the observer's images display means thereof displays observer's right face images adapted to distribute the right eye perspectives to observers' right eyes. In contrast, the stereo-pairs display means of the display 140 displays left eye perspectives, and the observers' images display means thereof displays observers' left face images adapted to distribute the left eye perspectives to observers' left eyes. As a result, any observer who is located in front of the half mirror 142, and is illuminated by the infrared light source 36 can perceive the right eye perspectives from the display 138 with his right eye, and the left eye perspectives from the display 140 with his left eye. Thus, the display of the present embodiment operates as a time-parallel type stereoscopic display.

The above two displays 138 and 140 may be arranged side by side in a vertical direction.

Figure 24:
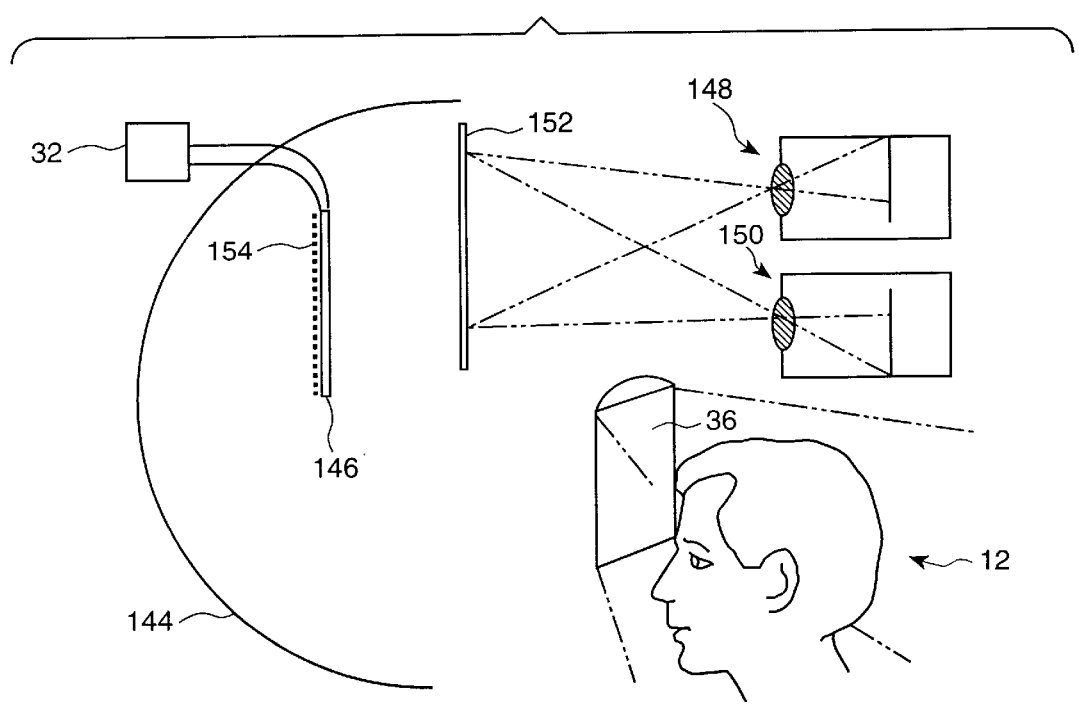
FIG. 24 is a schematic view of a fourteenth embodiment of a stereoscopic display in accordance with the present invention.

FIG. 24 illustrates a fourteenth embodiment of the present invention. As shown, a concave mirror 144 is disposed in front of observers 12, and a monochrome liquid crystal TV display 146 provided with no polarizer is disposed in the position where the concave mirror 144 substantially focuses optical images of each observer 12 such that a screen thereof faces the concave mirror 144. An infrared sensing member 154 is disposed on or in the vicinity of the screen of the monochrome liquid crystal TV display 146, and a diffuser 152 is disposed behind the monochrome liquid crystal TV display 146. Furthermore, two projectors 148 and 150 are disposed side by side behind the diffuser 152.

These projectors 148 and 150 respectively project right eye perspectives and left eye perspectives of which polarization axes are oriented approximately 90° with each other to the diffuser 152, and the diffuser 152 displays right eye perspectives and left eye perspectives with polarization axes thereof maintained. Thus, these projectors 148 and 150 and the diffuser 152 operate as stereo-pairs display means.

The display of the present embodiment operates as a time-parallel type stereoscopic display.

As described above, with the present invention, the taking means is situated so as to take observers' images by way of the focusing means. Thus, the focusing means both focuses observers' optical images substantially on the screen of the observers' face images display means, and projects observers on the taking means. Accordingly, the parallax between the observers' optical images focused on the screen of the observers' face images display means and the observers' face images displayed thereby is hardly generated, and accordingly the gap between the above two images is hardly generated.

With the stereoscopic display of the present invention, only the light rays emitted from or passing the positions where observers' right half face images or left half face images are displayed enter observers' right or left eyes by way of the focusing means. Since the parallax between the observers' face images displayed by the observers' face images display means for directing the stereo-pairs to the observers and the observers' optical images focused substantially on the screen of the observers' face images display means is hardly generated, the stereo-pairs enter the right and left eyes of each observer with accuracy.

In the preceding embodiments, the large convex lens, concave mirror or arrayed convex lens is used as the focusing means. Alternatively, a Fresnel convex lens, Fresnel concave mirror, or Selfoc lens may be used. In addition, these members may be arbitrarily combined with each other, or may have an arrayed configuration, respectively. Furthermore, a double integral lens array will do. The infrared TV camera or infrared sensing member as the taking means may be replaced with a TV camera or sensing member, which has sensitivity to visible light. In this case, illumination with infrared light is unnecessary, and binary and inverted binary images of each observer are obtained by using image processing technique.

The TV camera may be replaced with another taking system using microwave or ultrasonic wave.

The displays of the preceding embodiments may have a mechanism capable of automatically adjusting the distance between the observers' face images display means and the focusing means such that observers' optical images are focused substantially on a screen of the observers' face images display means.

The direction of the illumination with infrared light may be selected arbitrarily. Observers may be illuminated with infrared light by way of the focusing means.

The video tape recorder as the stereo-pairs forming means may be replaced with another member.

Furthermore, with the present invention, the TV camera need not necessarily be provided on the principle axis of the focusing means, the observers need not necessarily be illuminated with infrared light, and binary and inverted binary images of each observer may be obtained by using image processing technique.

In the preceding embodiments, the stereoscopic display is used as a display for one-way communication from a video tape recorder. Alternatively, the display of the present invention can be used as a TV display, stereoscopic display for domestic, industrial or medical use, and as a display for two-way communication such as multimedia, game machines, TV telephones, virtual reality or the like.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A stereoscopic display comprising:

stereo-pairs display means for selectively displaying stereo-pairs composed of right and left eye perspectives to be observed by observers;

observers' face images display means for displaying observers' face images, focusing means operable in conjunction with said observers' face images display means for directing the stereo-pairs displayed by said stereo-pairs display means to right and left eyes of each observer based on the observers' face images displayed by said observers' face images display means, said focusing means being positioned to focus observers' optical images substantially on a screen of said observers' face images display means in geometric agreement with the observers' face images displayed by the observers' face images display means; and taking means for continuously taking observers' visible light images or non-visible light images focused through said focusing means and adapted to form said observers' face images to be displayed by said observers' face images display means, said stereo-pairs display means being composed of transparent type electro-optical spatial modulation elements disposed between the observers and said focusing means to display the stereo-pairs in time-interlaced state, and said observers' face images display means being composed of a surface light source unit disposed behind said focusing means to display pairs of observers' face images of which flashing regions are inverted with each other in time-interlaced manner, one of each pair of observers' face images displayed by said surface light source unit selectively serving as backlight for said transparent type electro-optical spatial modulation elements so as to be synchronized with the time-interlaced display of said surface light source unit.

2. The stereoscopic display according to claim 1, wherein said surface light source unit is composed of a surface light source of which flashing regions are variable so as to be synchronized with the time-interlaced display of said electro-optical spatial modulation elements.

3. The stereoscopic display according to claim 2, wherein said surface light source unit comprises of at least one light source and transparent type electro-optical spatial modulation elements provided an a light emission side of said at least one light source.

4. A stereoscopic display comprising:

stereo-pairs display means for selectively displaying stereo-pairs composed of right and left eye perspectives to be observed by observers;

observers' face images display means for displaying observers' face images, focusing means operable in conjunction with said observers' face images display means for directing the stereo-pairs displayed by said stereo-pairs display means to right and left eyes of each observer based on the observers' face images displayed by said observers' face images display means, said focusing means being positioned to focus observers' optical images substantially on a screen of said observers' face images display means in geometric agreement with the observers' face images displayed by the observers' face images display means; and taking means for continuously taking observers' visible light images or non-visible light images focused through said focusing means and adapted to form said observers' face images to be displayed by said observers' face images display means, said stereo-pairs display means being composed of transparent type electro-optical spatial modulation elements disposed between the observers and said focusing means to display the stereo-pairs in time-parallel state, and said observers' face images display means being composed of a surface light source unit which is disposed behind said focusing means to display pairs of observers' face images of which polarization axes are oriented approximately 90° with respect to each other, said one of each pair of observers' face images displayed by said surface light source unit selectively serving as backlight for said transparent type electro-optical spatial modulation elements.

5. The stereoscopic display according to claim 4, wherein said surface light source unit includes a surface light source of which regions for emitting light rays of polarization axes oriented approximately 90° with respect to each other are variable.

6. The stereoscopic display according to claim 4, wherein said surface light source unit includes a surface light source of which flashing regions are substantially variable and two polarization plates of which polarization axes are oriented approximately 90° so as to correspond to the displayed pairs of observers' face images.

7. The stereoscopic display according to claim 4, wherein said surface light source unit is composed of a monochrome liquid crystal TV display, and in two polarization plates of said monochrome liquid crystal TV display, two kinds of regions of which polarization axes are oriented approximately 90° with respect to each other are distributed with uniformity.

8. The stereoscopic display according to claim 4, wherein said transparent type electro-optical spatial modulation elements are composed of a color liquid crystal image display plate wherein regions displaying left eye perspectives and those displaying right eye perspectives are alternately distributed with uniformity, and a polarizer on an input side thereof has such a member as to rotate polarization axes approximately 90° so as to correspond to said regions of said color liquid crystal image display plate.

9. A stereoscopic display comprising:

stereo-pairs display means for selectively displaying stereo-pairs composed of right and left eye perspectives to be observed by observers;

observers' face images display means for displaying observers' face images, focusing means operable in conjunction with said observers' face images display means for directing the stereo-pairs displayed by said stereo-pairs display means to right and left eyes of each observer based on the observers' face images displayed by said observers' face images display means, said focusing means being positioned to focus observers' optical images substantially on a screen of said observers' face images display means in geometric agreement with the observers' face images displayed by the observers' face images display means; and taking means for continuously taking observers' visible light images or non-visible light images focused through said focusing means and adapted to form said observers' face images to be displayed by said observers' face images display means, said stereo-pairs display means being composed of a surface light source disposed behind said observers' face images display means to display stereo-pairs in time-interlaced state, and said observers' face images display means being composed of transparent type electro-optical spatial modulation elements behind said focusing means to display pairs of observers' face images of which transparent regions are substantially inverted in time-interlaced manner.

10. The stereoscopic display according to claim 9, wherein said surface light source unit is composed of a surface light source of which flashing regions are variable so as to be synchronized with the time-interlaced display of said electro-optical spatial modulation elements.

11. The stereoscopic display according to claim 9, wherein said surface light source unit is composed of at least one light source and transparent type electro-optical modulation elements provided on a light emitting side of said at least one light source.

12. A stereoscopic display comprising:

stereo-pairs display means for selectively displaying stereo-pairs composed of right and left eye perspectives to be observed by observers;

observers' face images display means for displaying observers' face images, focusing means operable in conjunction with said observers' face images display means for directing the stereo-pairs displayed by said stereo-pairs display means to right and left eyes of each observer based on the observers' face images displayed by said observers' face images display means, said focusing means being positioned to focus observers' optical images substantially on a screen of said observers' face images display means in geometric agreement with the observers' face images displayed by the observers' face images display means; and taking means for continuously taking observers' visible light images or non-visible light images focused through said focusing means and adapted to form said observers' face images to be displayed by said observers' face images display means, said stereo-pairs display means being composed of a surface light source disposed behind said observers' face images display means to display the stereo-pairs in time-parallel manner, said observers' face images display means being composed of transparent type electro-optical spatial modulation elements disposed behind said focusing means to display pairs of observers' face images of which polarization axes are oriented approximately 90° with respect to each other, said transparent type electro-optical spatial modulation elements selectively transmitting one of said stereo-pairs displayed by said surface light source.

13. The stereoscopic display according to claim 12, wherein said surface light source is composed of a color liquid crystal display of which a polarization plate as an analyzer has two polarization axes, each corresponding to the right eye perspective display part or the left eye perspective display part, which are alternately oriented approximately 90° with respect to each other.

14. The stereoscopic display according to claim 12, wherein said surface light source is composed of two projectors which respectively project the right eye perspectives and left eye perspectives having different polarization axes oriented approximately 90° with respect to each other, and a diffuser which is provided in the projection surface of the two projectors to compose the right eye perspectives and left eye perspectives without any variation of the polarization axes thereof.

15. The stereoscopic display according to claim 12, wherein said transparent type electro-optical spatial modulation elements are composed of a monochrome liquid crystal display wherein two kinds of areas of which the polarization axes are oriented approximately 90° with respect to each other are distributed substantially uniformly in the polarization plates thereof.

16. A stereoscopic display comprising:

stereo-pairs display means for selectively displaying stereo-pairs composed of right and left eye perspectives to be ob served by observers;

observers' face images display means for displaying observers' face images, focusing means operable in conjunction with said observers' face images display means for directing the stereo-pairs displayed by said stereo-pairs display means to right and left eyes of each observer based on the observers' face images displayed by said observers' face images display means, said focusing means being positioned to focus observers' optical images substantially on a screen of said observers' face images display means in geometric agreement with the observers' face images displayed by the observers' face images display means; and taking means for continuously taking observers' visible light images or non-visible light images focused through said focusing means and adapted to form said observers' face images to be displayed by said observers' face images display means, said stereo-pairs display means being composed of transparent type electro-optical spatial modulation elements disposed between observers and said focusing means to display stereo-pairs in time-parallel state, and said observers' images display means being composed of a surface light source unit disposed behind said focusing means to display pairs of observers' face images of which flashing regions are substantially inverted in time-interlaced manner, said transparent type electro-optical spatial modulation elements selectively using one of each pair of observer's face images displayed by the surface light source unit as backlight so as to be synchronized with the time-interlaced display of the surface light source unit, an electrical-optical spatial modulation element being disposed between said surface light source unit and said spatial modulation elements for rotating the polarization axes of the pairs of observers' face images displayed by the surface light source unit approximately 90° so as to be synchronized with the time-interlaced display of the surface light source unit.

17. A stereoscopic display comprising:

stereo-pairs display means for selectively displaying stereo-pairs composed of right and left eye perspectives to be observed by observers;

observers' face images display means for displaying observers' face images, focusing means operable in conjunction with said observers' face images display means for directing the stereo-pairs displayed by said stereo-pairs display means to right and left eyes of each observer based on the observers' face images displayed by said observers' face images display means, said focusing means being positioned to focus observers' optical images substantially on a screen of said observers' face images display means in geometric agreement with the observers' face images displayed by the observers' face images display means; and taking means for continuously taking observers' visible light images or non-visible light images focused through said focusing means and adapted to form said observers' face images to be displayed by said observers' face images display means.

said stereo-pairs display means being composed of transparent type electro-optical spatial modulation elements disposed between said observers and said focusing means to display the stereo-pairs in time-interlaced state, and said observers' face images display means being composed of a surface light source unit disposed behind said focusing means to display pairs of observers' face images of which polarization axes are oriented approximately 90° with respect to each other, a transparent type electro-optical spatial modulation element being disposed between said surface light source unit and said spatial modulation elements for rotating said polarization axes of the pairs of observers' face images displayed by said surface light source unit approximately 90° so as to be synchronized with the time-interlaced display by said transparent type electro-optical spatial modulation elements.

18. A stereoscopic display comprising:

stereo-pairs display means for selectively displaying stereo-pairs composed of right and left eye perspectives to be observed by observers;

observers' face images display means for displaying observers' face images, focusing means operable in conjunction with said observers' face images display means for directing the stereo-pairs displayed by said stereo-pairs display means to right and left eyes of each observer based on the observers' face images displayed by said observers' face images display means, said focusing means being positioned to focus observers' optical images substantially on a screen of said observers' face images display means in geometric agreement with the observers' face images displayed by the observers' face images display means; and taking means for continuously taking observers' visible light images or non-visible light images focused through said focusing means and adapted to form said observers' face images to be displayed by said observers' face images display means, said stereo-pairs display means being composed of a surface light source disposed behind said observers' face images display means to display said stereo-pairs in time-parallel state, said observers' face images display means being composed of a transparent type electro-optical spatial modulation elements disposed behind said focusing means to display pairs of observers' face images of which transparent regions are substantially inverted in time-interlaced state, said transparent type electro-optical spatial modulation elements selectively transmitting one of said stereo-pairs in spatial-multiplexing state, an electro-optical spatial modulation element being disposed between said surface light source unit and said spatial modulation elements for rotating the polarization axes of the stereo-pairs displayed by said surface light source unit approximately 90° so as to be synchronized with the time-interlaced display of said spatial modulation elements.

19. A stereoscopic display comprising:

stereo-pairs display means for selectively displaying stereo-pairs composed of right and left eye perspectives to be observed by observers;

observers' face images display means for displaying observers' face images, focusing means operable in conjunction with said observers' face images display means for directing the stereo-pairs displayed by said stereo-pairs display means to right and left eyes of each observer based on the observers' face images displayed by said observers' face images display means, said focusing means being positioned to focus observers' optical images substantially on a screen of said observers' face images display means in geometric agreement with the observers' face images displayed by the observers' face images display means; and taking means for continuously taking observers' visible light images or non-visible light images focused through said focusing means and adapted to form said observers' face images to be displayed by said observers' face images display means, said stereo-pairs display means being composed of a surface light source unit disposed behind said observers' face images display means to display said stereo-pairs in time-interlaced state, and said observers' face images display means being composed of a surface light source unit disposed behind said observers' face images display means to display said stereo-pairs in time-interlaced state, and said observers' face images display means being composed of transparent type electro-optical spatial modulation elements disposed behind said focusing means to display observers' two face images of which polarization axes are oriented approximately 90° with respect to each other in spatial-multiplexing state, said transparent type electro-optical spatial modulation elements selectively transmitting one of said stereo-pairs in spatial-multiplexing state, an electro-optical spatial modulation element being disposed between said surface light source unit and said spatial modulation elements for rotating said polarization axes of said stereo-pairs displayed by said surface light source unit approximately 90° so as to be synchronized with the time-interlaced display of said surface light source unit.

20. A stereoscopic display comprising:

stereo-pairs display means for selectively displaying stereo-pairs composed of right and left eye perspectives to be observed by observers;

observers' face images display means for displaying observers' face images, focusing means operable in conjunction with said observers' face images display means for directing the stereo-pairs displayed by said stereo-pairs display means to right and left eyes of each observer based on the observers' face images displayed by said observers' face images display means, said focusing means being positioned to focus observers' optical images substantially on a screen of said observers' face images display means in geometric agreement with the observers' face images displayed by the observers' face images display means; and taking means for continuously taking observers' visible light images or non-visible light images focused through said focusing means and adapted to form said observers' face images to be displayed by said observers' face images display means, said stereo-pairs display means being composed of right eye perspectives display means and left eye perspectives display means, said observers' face images display means being composed of right half face images display means and left half face images display means, and said focusing means being composed of right eyes focusing means which faces said right half face images display means and left eyes focusing means which faces said left half face images display means, a half mirror for distributing observers' optical images to said right eyes focusing means and said left eyes focusing means, respectively, and composing said right eye perspectives displayed by said right eye perspectives display means and left eye perspectives displayed by said left eye perspectives display means being further included.

21. The stereoscopic display according to claim 1, 4, 9, 12, 16, 17, 18, 19 or 20, wherein said taking means is disposed between said focusing means and said observers' face images display means.

22. The stereoscopic display according to claim 21, wherein said taking means is composed of a half mirror and a video camera which detects the optical strength of a predetermined light reflected by said half mirror.

23. The stereoscopic display according to claim 22, wherein said taking means further comprising:

a diffuser disposed in the vicinity of a position where observers' images are focused by said half mirror, said video camera taking observers' images focused on said diffuser.

24. The stereoscopic display according to claim 23, further comprising:

at least one large convex lens, Fresnel convex lens, Selfoc lens, arrayed Fresnel convex lens and arrayed Selfoc lens, which is disposed in front of said diffuser.

25. The stereoscopic display according to claim 21, wherein said taking means is composed of a member which detects the optical strength of a predetermined light transmitted by way of said focusing means in the vicinity of a screen of said observers' face images display means.

26. The stereoscopic display according to claim 21, further comprising:

illuminating means for illuminating observers with a predetermined light.

27. The stereoscopic display according to claim 26, wherein said illuminating means illuminates said observers from one side thereof.

28. The stereoscopic display according to claim 26, wherein said illuminating means illuminates said observers by way of said focusing means.

29. The stereoscopic display according to claim 26, wherein said illuminating means illuminates said observers with infrared light.

30. The stereoscopic display according to claim 21, further comprising:

correcting means for correcting optical strength of observers' images obtained by said taking means based on a stereo-pairs signal input to said stereo-pairs display means so as to eliminate the influence of said stereo-pairs on said taking means.

31. The stereoscopic display according to claim 1, 4, 9, 12, 16, 17, 18, 19 or 20, further comprising image modulation processing means for forming binary face images of each observer based on said observers' images taken by said taking means and outputting formed binary face images to said observers' face images display means.

32. The stereoscopic display according to claim 31, further comprising:

image analyzing means for analyzing images taken by said taking means into observers' images.

33. The stereoscopic display according to claim 1, 4, 9, 12, 16, 17, 18, 19 or 20, wherein said focusing means is at least one of a large convex lens, Fresnel convex lens, Selfoc lens, concave mirror, Fresnel concave mirror, arrayed convex lens, arrayed Fresnel convex lens and arrayed Selfoc lens, arrayed concave mirror and Fresnel concave mirror.

34. The stereoscopic display according to claim 1, 4, 9, 12, 16, 17, 18, 19 or 20, further comprising:

at least one member out of a large convex lens, Fresnel convex lens, Selfoc lens, arrayed Fresnel concave lens and arrayed Selfoc lens, which is disposed in front of a screen of said observers' face images display means.

35. The stereoscopic display according to claim 1, 4, 9, 12, 16, 17, 18, 19 or 20, further comprising:

at least one member out of a large convex lens, Fresnel convex lens, Selfoc lens, arrayed Fresnel convex lens and arrayed Selfoc lens, which is disposed in front of a screen of said stereo-pairs display means.

36. The stereoscopic display according to claim 1, 4, 9, 12, 16, 17, 18, 19 or 20, further comprising:

a mechanism for automatically adjusting the distance between said observers' face images display means and said focusing means such that observers' optical images are focused substantially on a screen of said observers' face images display means.

37. The stereoscopic display according to claim 1, 4, 9, 12, 16, 17, 18, 19 or 20, wherein said stereoscopic display is used as a display for digital images.

38. The stereoscopic display according to claim 1, 4, 9, 12, 16, 17, 18, 19 or 20, wherein said stereoscopic display is used as a display for analog images.

39. The stereoscopic display according to claim 1, 4, 9, 12, 16, 17, 18, 19 or 20, wherein said stereoscopic display is used as a display for one-way communication.

40. The stereoscopic display according to claim 1, 4, 9, 12, 16, 17, 18, 19 or 20, wherein said stereoscopic display is used as a display for two-way communication.

* * * * *